(12) United States Patent
Pagolu et al.

(10) Patent No.: US 12,135,737 B1
(45) Date of Patent: Nov. 5, 2024

(54) GRAPHICAL USER INTERFACE AND PIPELINE FOR TEXT ANALYTICS

(71) Applicant: SAS Institute Inc., Cary, NC (US)

(72) Inventors: Murali Krishna Pagolu, Cary, NC (US); Corey Kyle Kozak, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 18/615,319

(22) Filed: Mar. 25, 2024

Related U.S. Application Data

(60) Provisional application No. 63/528,606, filed on Jul. 24, 2023, provisional application No. 63/522,373, filed on Jun. 21, 2023.

(51) Int. Cl.
 G06F 16/34 (2019.01)
(52) U.S. Cl.
 CPC ..................... G06F 16/34 (2019.01)
(58) Field of Classification Search
 CPC ....................................................... G06F 16/34
 USPC ......................................................... 707/805
 See application file for complete search history.

(56) References Cited

U.S. PATENT DOCUMENTS

| | | | | |
|---|---|---|---|---|
| 6,823,331 | B1 * | 11/2004 | Abu-Hakima | .......... G06F 16/34 707/E17.093 |
| 7,945,600 | B1 * | 5/2011 | Thomas | ................ G06F 16/353 707/804 |
| 8,326,809 | B2 | 12/2012 | Vetere | |

(Continued)

FOREIGN PATENT DOCUMENTS

| | | | | |
|---|---|---|---|---|
| CN | 110175323 A | * | 8/2019 | ............ G06F 16/34 |
| JP | 2003141129 A | * | 5/2003 | |

(Continued)

OTHER PUBLICATIONS

Gupta N., "Extracting Phrases Describing Problems with Products and Services from Twitter Messages", Computacion y Sistemas, vol. 17, No. 2, 2013, pp. 197-206. (Year: 2013).*

(Continued)

*Primary Examiner* — Phuong Thao Cao
(74) *Attorney, Agent, or Firm* — Kilpatrick Townsend & Stockton LLP

(57) ABSTRACT

A graphical user interface (GUI) and pipeline for processing text documents is provided herein. In one example, a system can receive unstructured text documents. The system can determine entity-issue descriptions corresponding to the unstructured text documents. The system can then generate a GUI indicating the entity-issue descriptions. The GUI can also indicate assignments of the unstructured text documents to categories of a predefined schema. The GUI can allow the user to adjust the assignments of the unstructured text documents to the categories. The GUI can also include a table of rows, where each row corresponds to one of the unstructured text documents. Each row can indicate an entity-issue description in the corresponding unstructured text document and the categories assigned to the unstructured text document. Each row can also include a graphical button that is selectable to allow the user to view the unstructured text document corresponding to the row.

29 Claims, 23 Drawing Sheets

(56) References Cited

U.S. PATENT DOCUMENTS

| | | | |
|---|---|---|---|
| 8,463,790 B1* | 6/2013 | Joshi | G06F 3/0482 |
| | | | 707/738 |
| 8,745,091 B2* | 6/2014 | McHenry | G06F 16/00 |
| | | | 707/706 |
| 8,812,435 B1* | 8/2014 | Zhao | G06F 16/9535 |
| | | | 706/45 |
| 8,832,015 B2 | 9/2014 | Cox et al. | |
| 9,202,176 B1* | 12/2015 | Kapur | G06N 7/01 |
| 9,460,071 B2 | 10/2016 | Avasarala et al. | |
| 9,552,547 B2 | 1/2017 | Leeman-Munk et al. | |
| 9,595,002 B2 | 3/2017 | Leeman-Munk et al. | |
| 9,811,505 B2 | 11/2017 | Gagliano et al. | |
| 10,559,308 B2 | 2/2020 | Smythe et al. | |
| 10,902,329 B1 | 1/2021 | Mills et al. | |
| 10,978,053 B1 | 4/2021 | Smythe et al. | |
| 11,049,235 B2 | 6/2021 | Wheaton et al. | |
| 11,087,077 B2 | 8/2021 | Wheaton et al. | |
| 11,145,309 B1 | 10/2021 | Yang | |
| 11,238,079 B2* | 2/2022 | Simard | G06F 16/35 |
| 11,334,809 B1 | 5/2022 | Pasour et al. | |
| 11,335,350 B2 | 5/2022 | Li et al. | |
| 11,373,655 B2 | 6/2022 | Li et al. | |
| 11,423,680 B1 | 8/2022 | Jade et al. | |
| 11,475,074 B2* | 10/2022 | Paterson | G06F 16/904 |
| 11,501,547 B1 | 11/2022 | Jade et al. | |
| 11,943,188 B1* | 3/2024 | Rathi | H04L 51/212 |
| 12,002,010 B2* | 6/2024 | Toudji | G06F 40/20 |
| 2001/0018698 A1* | 8/2001 | Uchino | G06Q 10/107 |
| | | | 707/E17.058 |
| 2003/0088824 A1* | 5/2003 | Ayan | G06Q 30/02 |
| | | | 715/201 |
| 2006/0197764 A1* | 9/2006 | Yang | G06T 13/80 |
| | | | 345/473 |
| 2007/0124291 A1* | 5/2007 | Hassan | G06F 16/34 |
| | | | 707/E17.093 |
| 2008/0097937 A1* | 4/2008 | Hadjarian | G06N 20/00 |
| | | | 706/12 |
| 2008/0249999 A1* | 10/2008 | Renders | G06F 16/355 |
| 2009/0327243 A1* | 12/2009 | Pradhan | G06F 16/93 |
| | | | 707/E17.046 |
| 2011/0202886 A1* | 8/2011 | Deolalikar | G06F 16/353 |
| | | | 715/853 |
| 2012/0240032 A1* | 9/2012 | McKeown | G06Q 10/10 |
| | | | 715/254 |
| 2013/0024389 A1* | 1/2013 | Gupta | G06Q 30/0201 |
| | | | 705/319 |
| 2013/0035961 A1* | 2/2013 | Yegnanarayanan | G16H 10/60 |
| | | | 705/3 |
| 2013/0091145 A1* | 4/2013 | Heo | G06F 16/9535 |
| | | | 707/754 |
| 2013/0174058 A1* | 7/2013 | Kaul | G06N 20/00 |
| | | | 715/753 |
| 2013/0238989 A1* | 9/2013 | Chu | G06F 16/9538 |
| | | | 715/273 |
| 2014/0122486 A1* | 5/2014 | Simard | G06N 99/00 |
| | | | 707/737 |
| 2015/0033141 A1* | 1/2015 | Mishra | H04L 51/42 |
| | | | 715/752 |
| 2015/0154195 A1* | 6/2015 | Lightner | G06F 16/24578 |
| | | | 707/750 |
| 2016/0140220 A1* | 5/2016 | Chaumartin | G06F 16/9024 |
| | | | 707/740 |
| 2016/0156579 A1* | 6/2016 | Kaufmann | H04L 51/42 |
| | | | 709/206 |
| 2016/0239500 A1* | 8/2016 | Dave | G06F 16/355 |
| 2017/0142043 A1* | 5/2017 | Narayanswamy | G06F 40/279 |
| 2017/0270127 A1* | 9/2017 | Chen | G06F 16/316 |
| 2017/0300821 A1* | 10/2017 | Hong | G06F 16/93 |
| 2017/0323061 A1* | 11/2017 | D'Souza | G16H 40/63 |
| 2018/0024998 A1* | 1/2018 | Takemoto | G06F 16/248 |
| | | | 707/730 |
| 2018/0081859 A1* | 3/2018 | Snider | G06F 40/44 |
| 2018/0173698 A1* | 6/2018 | Dubey | G06F 16/3347 |
| 2018/0307744 A1* | 10/2018 | Gadekar | G06F 16/287 |
| 2018/0322430 A1* | 11/2018 | Guha | G06Q 10/06316 |
| 2019/0220695 A1* | 7/2019 | Nefedov | G06F 16/285 |
| 2020/0175052 A1* | 6/2020 | Wang | G06F 16/34 |
| 2021/0119951 A1* | 4/2021 | Santos | G06F 40/284 |
| 2022/0309428 A1* | 9/2022 | Powers | G06N 20/00 |
| 2023/0135625 A1* | 5/2023 | Wang | G06F 18/2113 |
| | | | 704/9 |
| 2023/0185769 A1* | 6/2023 | Lichtenberg | G06F 16/168 |
| | | | 707/821 |
| 2023/0206287 A1* | 6/2023 | Sethuraman | G06Q 30/0282 |
| | | | 705/347 |
| 2023/0214754 A1* | 7/2023 | Eidelman | G06Q 10/06375 |
| | | | 705/7.37 |

FOREIGN PATENT DOCUMENTS

| | | | | |
|---|---|---|---|---|
| JP | 2003330947 A | * | 11/2003 | |
| JP | 2011123794 A | * | 6/2011 | |
| KR | 20210059954 A | * | 5/2021 | |
| KR | 102389671 B1 | * | 4/2022 | |
| WO | WO-2010085620 A2 | * | 7/2010 | G06F 17/3071 |
| WO | WO-2014016637 A1 | * | 1/2014 | H04H 60/51 |

OTHER PUBLICATIONS

Ahmed E., "Using Part Of Speech Patterns for Analysing Tweets", University of Eastern Finland, School of Computing, Master's Thesis, Dec. 2021, 47 pages. (Year: 2021).*

* cited by examiner

| Example Text | Parts-of-Speech Tags |
|---|---|
| The customer says the [airbag lights is blinking]. | Det N V3sg Det [N N BE3sg Ving] |
| The [engine is overheating] regardless of the coolant level. | Det [N BE3sg Ving] Prep Det N N |
| The [battery is dying] after driving only a few miles. | Det [N BE3sg Ving] Prep N C Det A Npl |
| The root cause of the issue is that the [intake manifold is leaking]. | Det N N Prep Det N V3sg C Det [N N BE3sg Ving] |

1702 — Parts-of-Speech Tags
1704 — Example Text

1706 — Entity Part-of-Speech Patterns
| |
|---|
| N |
| N N |

1710 — Connector Part-of-Speech Patterns
| |
|---|
| BE3sg |

1708 — Issue Part-of-Speech Patterns
| |
|---|
| Ving |

FIG. 17

GRAPHICAL USER INTERFACE AND PIPELINE FOR TEXT ANALYTICS

REFERENCE TO RELATED APPLICATION

This claims the benefit of priority under 35 U.S.C. § 119 (e) to U.S. Provisional Patent Application No. 63/522,373 filed Jun. 21, 2023, and to U.S. Provisional Patent Application No. 63/528,606 filed Jul. 24, 2023, the entirety of each of which is hereby incorporated by reference herein.

TECHNICAL FIELD

The present disclosure relates generally to natural language processing of text documents on a computer. More specifically, but not by way of limitation, this disclosure relates to a graphical user interface and pipeline for processing text documents.

BACKGROUND

Unstructured text is now one of the most common types of data generated by humans and is growing at an exponential rate. Unstructured text refers to natural language text that includes written human language, such as the free-form text humans type on their keyboards or touch screens. Examples of unstructured text can include social media posts (e.g., tweets), product or service reviews, blog posts, books, e-mails, word processing documents, etc. Unstructured text is different from structured data, which is organized in a pre-defined format from which well-defined semantics can be inferred.

Unstructured text is used in a variety of industries for various purposes. This process normally begins with an entity obtaining a huge library of text documents containing unstructured text for analysis and processing. Although commonly referred to as "text documents," the term "document" is not limited to a document format and may be any type of textual dataset in any suitable format for storing unstructured text. These libraries may include millions or billions of text documents, which can be used for any number of downstream processes.

SUMMARY

One example of the present disclosure includes a system comprising one or more processors and one or more memories. The one or more memories include program code that is executable by the one or more processors for causing the one or more processors to perform operations. The operations can include receiving unstructured text documents from one or more sources, wherein the unstructured text documents describe issues with entities. The operations can include determining entity-issue descriptions corresponding to the unstructured text documents. The operations can include generating a graphical user interface indicating the entity-issue descriptions corresponding to the unstructured text documents. The graphical user interface can indicate assignments of the unstructured text documents to one or more categories of a predefined schema by a user or a rule-based model. The graphical user interface can be configured to allow the user to adjust the assignments of the unstructured text documents to the one or more categories based on the entity-issue descriptions in the unstructured text documents. The graphical user interface can include a table of rows. Each row in the table can correspond to one of the unstructured text documents and indicate a respective entity-issue description in the unstructured text document. Each row can further indicate the one or more categories of the predefined schema assigned to the unstructured text document. Each row of the graphical user interface can further include a graphical button that is selectable to allow the user to selectively view the unstructured text document corresponding to the row. The assignments of the unstructured text documents to the one or more categories can be usable to tune the rule-based model or to generate training data for training a machine-learning model that is different than the rule-based model.

Another example of the present disclosure can include a method of operations. The operations can be performed by one or more processors. The operations can include receiving unstructured text documents from one or more sources, wherein the unstructured text documents describe issues with entities. The operations can include determining entity-issue descriptions corresponding to the unstructured text documents. The operations can include generating a graphical user interface indicating the entity-issue descriptions corresponding to the unstructured text documents. The graphical user interface can indicate assignments of the unstructured text documents to one or more categories of a predefined schema by a user or a rule-based model. The graphical user interface can be configured to allow the user to adjust the assignments of the unstructured text documents to the one or more categories based on the entity-issue descriptions in the unstructured text documents. The graphical user interface can include a table of rows. Each row in the table can correspond to one of the unstructured text documents and indicate a respective entity-issue description in the unstructured text document. Each row can further indicate the one or more categories of the predefined schema assigned to the unstructured text document. Each row of the graphical user interface can further include a graphical button that is selectable to allow the user to selectively view the unstructured text document corresponding to the row. The assignments of the unstructured text documents to the one or more categories can be usable to tune the rule-based model or to generate training data for training a machine-learning model that is different than the rule-based model.

Still another example of the present disclosure can include a non-transitory computer-readable medium comprising program code that is executable by one or more processors for causing the one or more processors to perform operations. The operations can include receiving unstructured text documents from one or more sources, wherein the unstructured text documents describe issues with entities. The operations can include determining entity-issue descriptions corresponding to the unstructured text documents. The operations can include generating a graphical user interface indicating the entity-issue descriptions corresponding to the unstructured text documents. The graphical user interface can indicate assignments of the unstructured text documents to one or more categories of a predefined schema by a user or a rule-based model. The graphical user interface can be configured to allow the user to adjust the assignments of the unstructured text documents to the one or more categories based on the entity-issue descriptions in the unstructured text documents. The graphical user interface can include a table of rows. Each row in the table can correspond to one of the unstructured text documents and indicate a respective entity-issue description in the unstructured text document. Each row can further indicate the one or more categories of the predefined schema assigned to the unstructured text document. Each row of the graphical user interface can further include a graphical button that is selectable to allow the user to selectively view the unstructured text document corresponding to the row. The assignments of the unstructured text documents to the one or more categories can be usable to tune the rule-based model or to generate training data for training a machine-learning model that is different than the rule-based model.

Another example of the present disclosure includes a system comprising one or more processors and one or more memories. The one or more memories can include program code that is executable by the one or more processors for causing the one or more processors to perform operations. The operations can include receiving a first set of unstructured text documents from one or more sources, wherein the first set of unstructured text documents describe issues with entities. The operations can include executing a tokenizer on the first set of unstructured text documents to determine a plurality of tokens in the first set of unstructured text documents, the tokenizer being configured to use a predefined delimiter to identify the plurality of tokens in the first set of unstructured text documents. The operations can include identifying unknown tokens in the plurality of tokens, the unknown tokens being tokens that do not exist in a predefined token library. The operations can include generating a correlation library by, for each of the unknown tokens: generating at least two candidate alternative tokens for the unknown token; selecting an alternative token, from among the at least two candidate alternative tokens, based on a predefined set of rules; and updating the correlation library to include a correlation between the unknown token and the selected alternative token. The operations can include normalizing a second set of unstructured text documents by replacing at least some of the unknown tokens in the second set of unstructured text documents with their selected alternative tokens in the correlation library, to thereby generate normalized unstructured text documents.

Yet another example of the present disclosure can include a method of operations. The operations can be performed by one or more processors. The operations can include receiving a first set of unstructured text documents from one or more sources, wherein the first set of unstructured text documents describe issues with entities. The operations can include executing a tokenizer on the first set of unstructured text documents to determine a plurality of tokens in the first set of unstructured text documents, the tokenizer being configured to use a predefined delimiter to identify the plurality of tokens in the first set of unstructured text documents. The operations can include identifying unknown tokens in the plurality of tokens, the unknown tokens being tokens that do not exist in a predefined token library. The operations can include generating a correlation library by, for each of the unknown tokens: generating at least two candidate alternative tokens for the unknown token; selecting an alternative token, from among the at least two candidate alternative tokens, based on a predefined set of rules; and updating the correlation library to include a correlation between the unknown token and the selected alternative token. The operations can include normalizing a second set of unstructured text documents by replacing at least some of the unknown tokens in the second set of unstructured text documents with their selected alternative tokens in the correlation library, to thereby generate normalized unstructured text documents.

Still another example of the present disclosure can include a non-transitory computer-readable medium comprising program code that is executable by one or more processors for causing the one or more processors to perform operations. The operations can include receiving a first set of unstructured text documents from one or more sources, wherein the first set of unstructured text documents describe issues with entities. The operations can include executing a tokenizer on the first set of unstructured text documents to determine a plurality of tokens in the first set of unstructured text documents, the tokenizer being configured to use a predefined delimiter to identify the plurality of tokens in the first set of unstructured text documents. The operations can include identifying unknown tokens in the plurality of tokens, the unknown tokens being tokens that do not exist in a predefined token library. The operations can include generating a correlation library by, for each of the unknown tokens: generating at least two candidate alternative tokens for the unknown token; selecting an alternative token, from among the at least two candidate alternative tokens, based on a predefined set of rules; and updating the correlation library to include a correlation between the unknown token and the selected alternative token. The operations can include normalizing a second set of unstructured text documents by replacing at least some of the unknown tokens in the second set of unstructured text documents with their selected alternative tokens in the correlation library, to thereby generate normalized unstructured text documents.

Another example of the present disclosure includes a system comprising one or more processors and one or more memories. The one or more memories can include program code that is executable by the one or more processors for causing the one or more processors to perform operations. The operations can include receiving a set of unstructured text documents from one or more sources. The set of unstructured text documents can describe issues with entities. The operations can include receiving a first dataset that includes a first plurality of part-of-speech patterns indicative of entities. The operations can include receiving a second dataset that includes a second plurality of part-of-speech patterns indicative of issues. The operations can include receiving a third dataset that includes a third plurality of part-of-speech patterns indicative of connectors. The operations can include analyzing the set of unstructured text documents using a plurality of combinations of the first plurality of part-of-speech patterns, the second plurality of part-of-speech patterns, and the third plurality of part-of-speech patterns to identify a plurality of entity-issue descriptions in the set of unstructured text documents. Each combination of the plurality of combinations can be different from the other combinations in the plurality of combinations. The operations can include outputting the plurality of entity-issue descriptions identified in the set of unstructured text documents.

Yet another example of the present disclosure can include a method of operations. The operations can be performed by one or more processors. The operations can include receiving a set of unstructured text documents from one or more sources. The set of unstructured text documents can describe issues with entities. The operations can include receiving a first dataset that includes a first plurality of part-of-speech patterns indicative of entities. The operations can include receiving a second dataset that includes a second plurality of part-of-speech patterns indicative of issues. The operations can include receiving a third dataset that includes a third plurality of part-of-speech patterns indicative of connectors. The operations can include analyzing the set of unstructured text documents using a plurality of combinations of the first plurality of part-of-speech patterns, the second plurality of part-of-speech patterns, and the third plurality of part-of-speech patterns to identify a plurality of entity-issue descriptions in the set of unstructured text documents. Each combination of the plurality of combinations can be different from the other combinations in the plurality of combinations. The operations can include outputting the plurality of entity-issue descriptions identified in the set of unstructured text documents.

Still another example of the present disclosure can include a non-transitory computer-readable medium comprising program code that is executable by one or more processors for causing the one or more processors to perform operations. The operations can include receiving a set of unstructured text documents from one or more sources. The set of unstructured text documents can describe issues with entities. The operations can include receiving a first dataset that includes a first plurality of part-of-speech patterns indicative of entities. The operations can include receiving a second dataset that includes a second plurality of part-of-speech patterns indicative of issues. The operations can include receiving a third dataset that includes a third plurality of part-of-speech patterns indicative of connectors. The operations can include analyzing the set of unstructured text documents using a plurality of combinations of the first plurality of part-of-speech patterns, the second plurality of part-of-speech patterns, and the third plurality of part-of-speech patterns to identify a plurality of entity-issue descriptions in the set of unstructured text documents. Each combination of the plurality of combinations can be different from the other combinations in the plurality of combinations. The operations can include outputting the plurality of entity-issue descriptions identified in the set of unstructured text documents.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 17 shows an example of entity part-of-speech patterns and issue part-of-speech patterns according to some aspects of the present disclosure.

Figure 1:
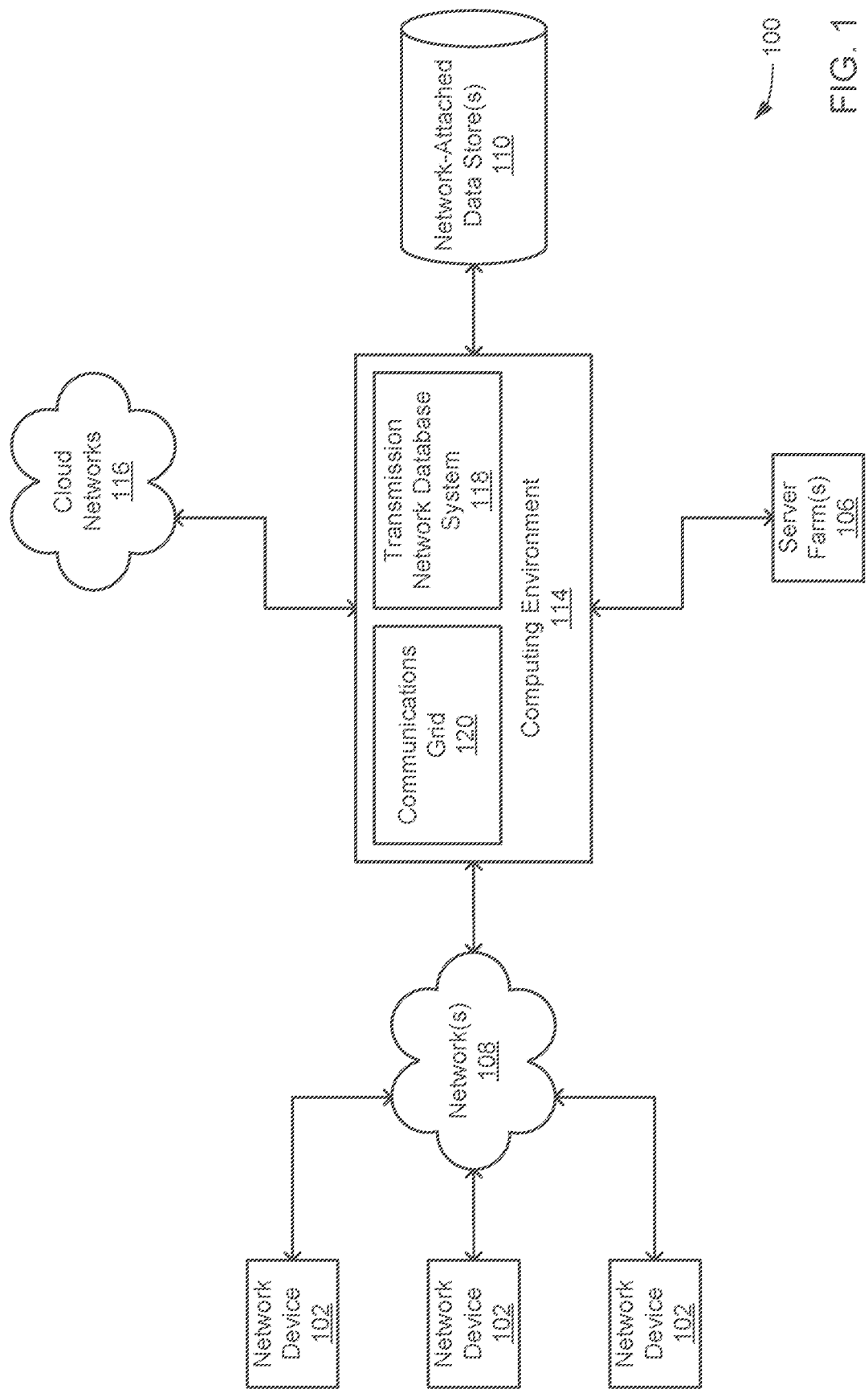
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

In various industries, a computer system may be used to process a set of text documents, such as product or service reviews, to derive some insights. Because these text documents are often written in natural language format, a computer system may employ natural language processing (NLP) techniques to process the text documents. There are many methods to conduct this kind of natural language processing, but they each have their unique strengths and weaknesses. Some NLP techniques that work well for some kinds of text documents do not work well for others. In general, analyzing unstructured text documents for underlying themes and patterns can be a complex and tedious process.

One example of text documents that can be particularly difficult to analyze using conventional NLP techniques are text documents that describe problems, such as user reports of malfunctioning vehicle parts. Existing NLP techniques, such as text topic modeling and clustering, can have significant limitations when applied to these and other kinds of text documents. For instance, these NLP techniques may ignore context, or limit context to a certain number of tokens in the text document, which can reduce their accuracy. These NLP techniques also make it difficult to separate true positives from false positives purely by looking at significant terms related to topics/clusters, which makes it difficult to assess their accuracy. Additionally, these NLP techniques rely on statistical significance, which means that emerging issues/trends may go undetected. Further, many NLP techniques involve machine-learning models that depend on a significant amount of training data (e.g., gigabytes or terabytes of training data), which can be difficult and time consuming to develop. As a result, there is a need for improved techniques for a computer to automatically process text documents, particularly those describing problems.

Some examples of the present disclosure can overcome one or more of the abovementioned problems by providing a system that can process text documents based on part-of-speech patterns, which can be faster and more accurate than conventional approaches. This approach can also consume fewer computing resources (e.g., processing power and memory) than conventional NLP approaches, which may require large machine-learning models that consume significant amounts of memory and processing power to execute.

More specifically, a first set of text documents can be evaluated to determine the parts-of-speech of a set of tokens therein. The first set of documents can be evaluated to determine the parts-of-speech of the tokens to identify part-of-speech (POS) patterns indicative of entities, issues, and connectors. Examples of entities can include people, scores or grades, products, software, electronic devices, services or offerings, etc. Examples of issues can include problems, anomalies, or mistakes. A connector can be a word or phrase that ties an entity to an issue in a text document. Through this process, entity POS patterns, issue POS patterns, and connector POS patterns can be identified. For example, it may be determined that two nouns in a row is highly indicative of an entity. It may also be determined that a verb ending in "-ing" is highly indicative of an issue. So, the pattern "noun noun" can be added to the list of entity POS patterns and the pattern "Ving" can be added to the list of issue POS patterns.

After the POS patterns (e.g., the entity POS patterns, issue POS patterns, and connector POS patterns) have been determined using the first set of text documents, the system can automatically determine the parts-of-speech of a set of tokens in a second set of text documents. The system can then automatically compare different combinations of the POS patterns to the parts-of-speech of the tokens in the second set of text documents, to identify entity-issue descriptions in the second set of text documents. An entity-issue description is a description in a text document of an issue with an entity. One example of an entity-issue description may be "the airbag did not deploy." Another example of an entity-issue description may be "I got an unfair score on my report." Still another example of an entity-issue description may be "the patient has important elevations in alanine aminotransferase." In each of these examples, the text document describes an issue ("did not deploy," "unfair score," "elevations in alanine aminotransferase") associated with an entity ("the airbag," "my report," "the patient"). In this way, the system can quickly and accurately identify the entity-issue descriptions in the second set of text documents.

In some examples, the system may perform a data-cleansing process on the first set of text documents and/or the second set of text documents. For example, the system may analyze one of the text documents for any unknown tokens. An unknown token can be a token that is not in a default library of tokens. For instance, an unknown token may be slang for a word that is in the default library and, thus, may not be present in the library. If the system identifies an unknown token in the text document, the system can determine one or more candidate alternative tokens that can be used to replace the unknown token in the text document. For instance, the system may determine four or more candidate alternative tokens for a single unknown token. After determining the candidate alternative tokens, the system can select one of the candidate alternative tokens based on a predefined set of rules. The system can then update a correlation library to include a mapping between the unknown token and the selected candidate. The correlation library can serve as a sort of "synonym library" that has correlations between unknown tokens and their selected counterparts. When the system sees the unknown token in the same text document or a different text document in the future (e.g., in the first set of text documents or the second set of text documents), the system can replace the unknown token in the text document with its corresponding alternative from the correlation library. This can help normalize the text documents, which may improve their processing in subsequent steps.

In some examples, the system can execute a rule-based model to automatically assign the second set of text documents to one or more predefined categories of a predefined schema. The rule-based model can be a model that implements a set of preprogrammed logical rules to perform this assignment, which can be different from a machine-learning model. The system can then generate a graphical user interface (GUI) indicating, for each text document, the categories assigned to the text document and the entity-issue description derived from the text document. A user can compare the assigned categories to the entity-issue descriptions, to determine whether the rule-based model's categorizations are correct (according to the user's judgement). If a category assigned to a text document is incorrect, the user can use the GUI to manually change the categories assigned to the text document. The system may then use the category assignments to automatically tune the rule-based model, thereby improving its accuracy. In this way, the system can provide a feedback loop through which the user can help improve the accuracy of the rule-based model by comparing the engine's categorizations to the entity-issue descriptions and correcting any errors.

In some examples, the system may automatically generate training data for a machine-learning model. To do so, the system can tag the second set of text documents with their entity-issue descriptions and/or category assignments. This tagged set of text documents can then serve as the training data. This can significantly expedite and simplify the process for generating the training data. The system can then train the machine-learning model based on the training data to identify entity-issue descriptions or categories associated with text documents. Following this training process, the machine-learning model may be able to receive a text document as input and generate an output indicating an entity-issue description and/or a category associated with text document. The trained machine-learning model may then be used to supplement or replace the rule-based model.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
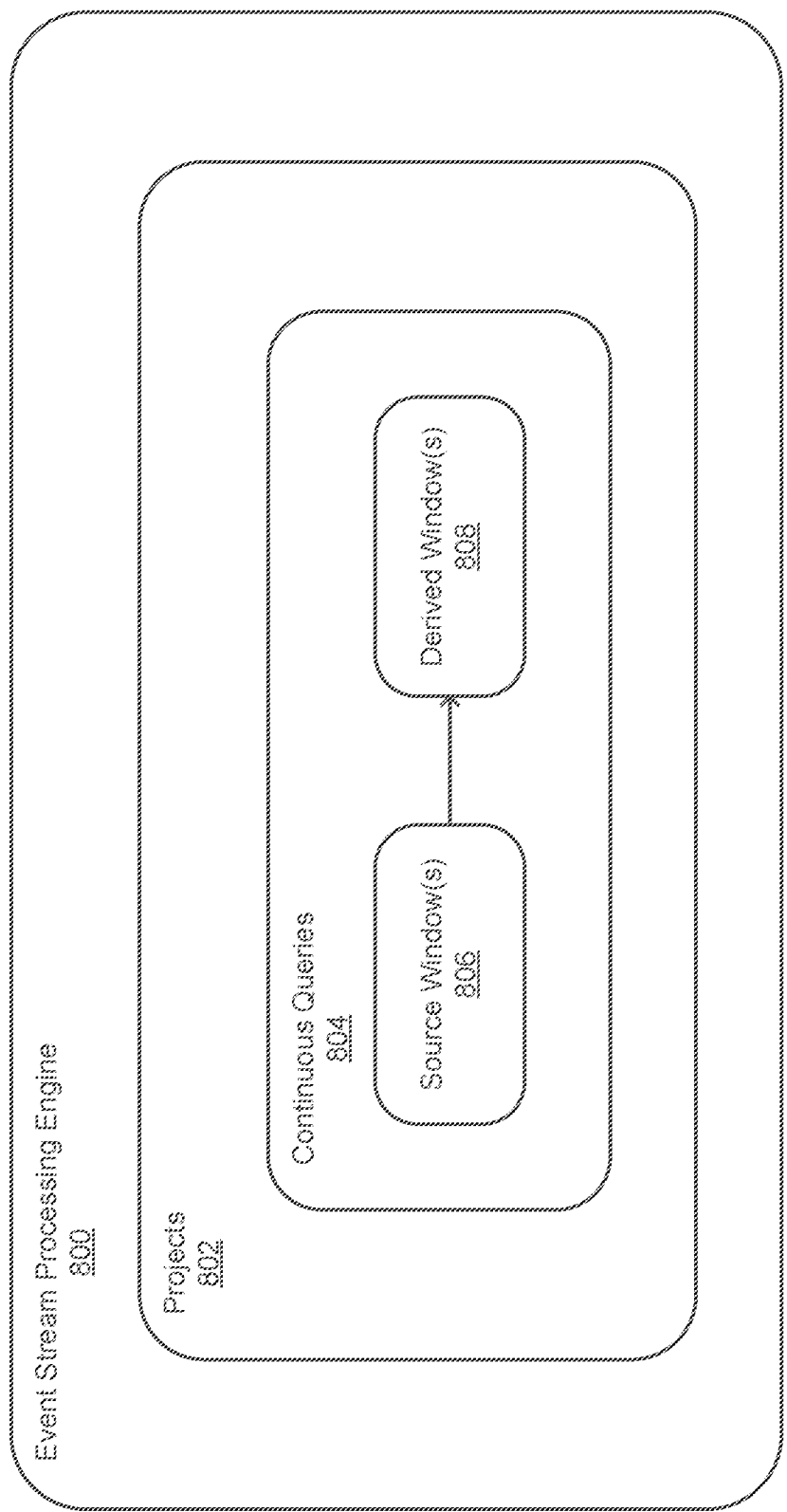
FIG. 8 shows a block diagram including components of an Event Stream Processing Engine (ESPE) according to some aspects of the present disclosure.
Figure 9:
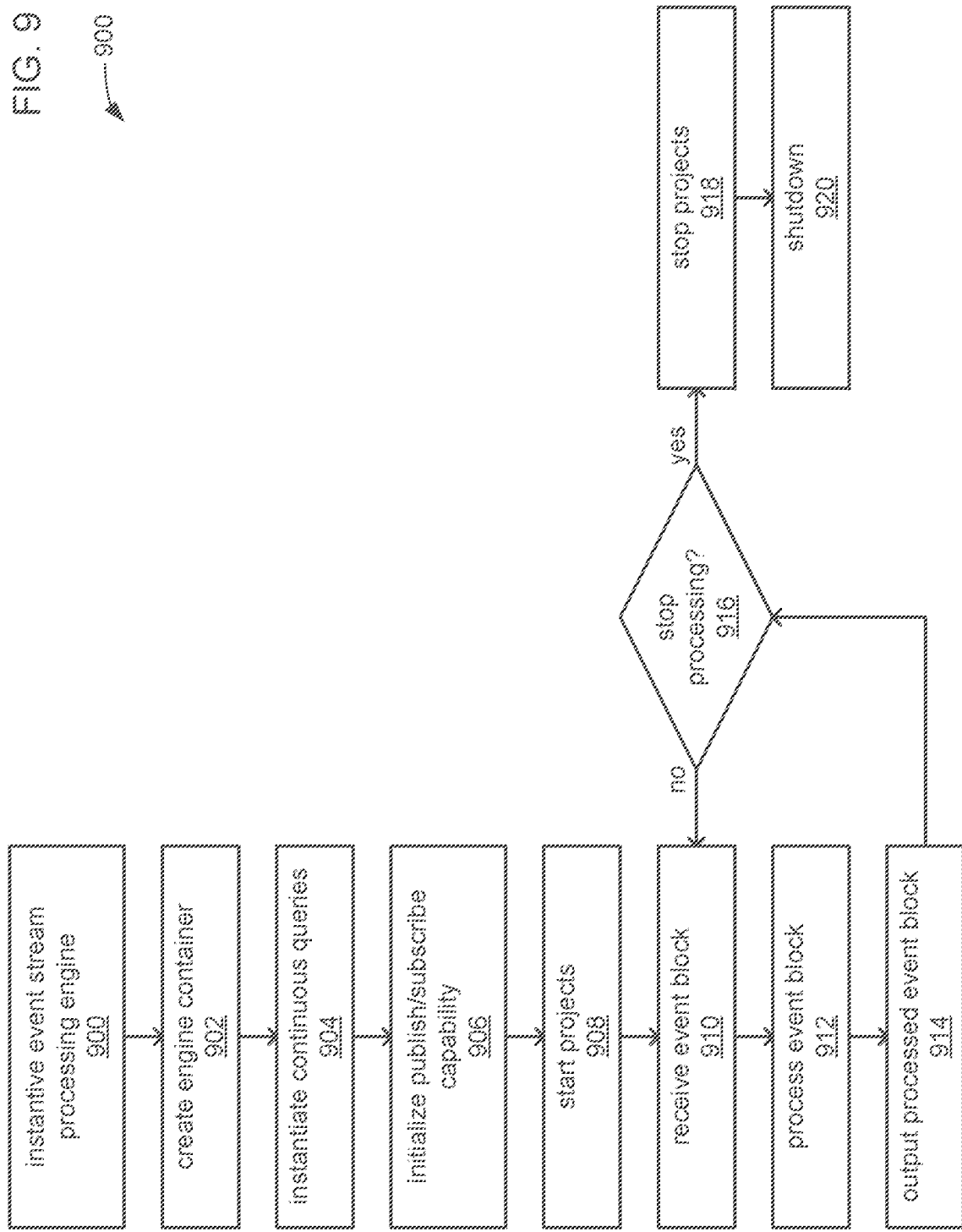
FIG. 9 shows a flow chart of an example process including operations performed by an event stream processing engine according to some aspects of the present disclosure.
Figure 10:
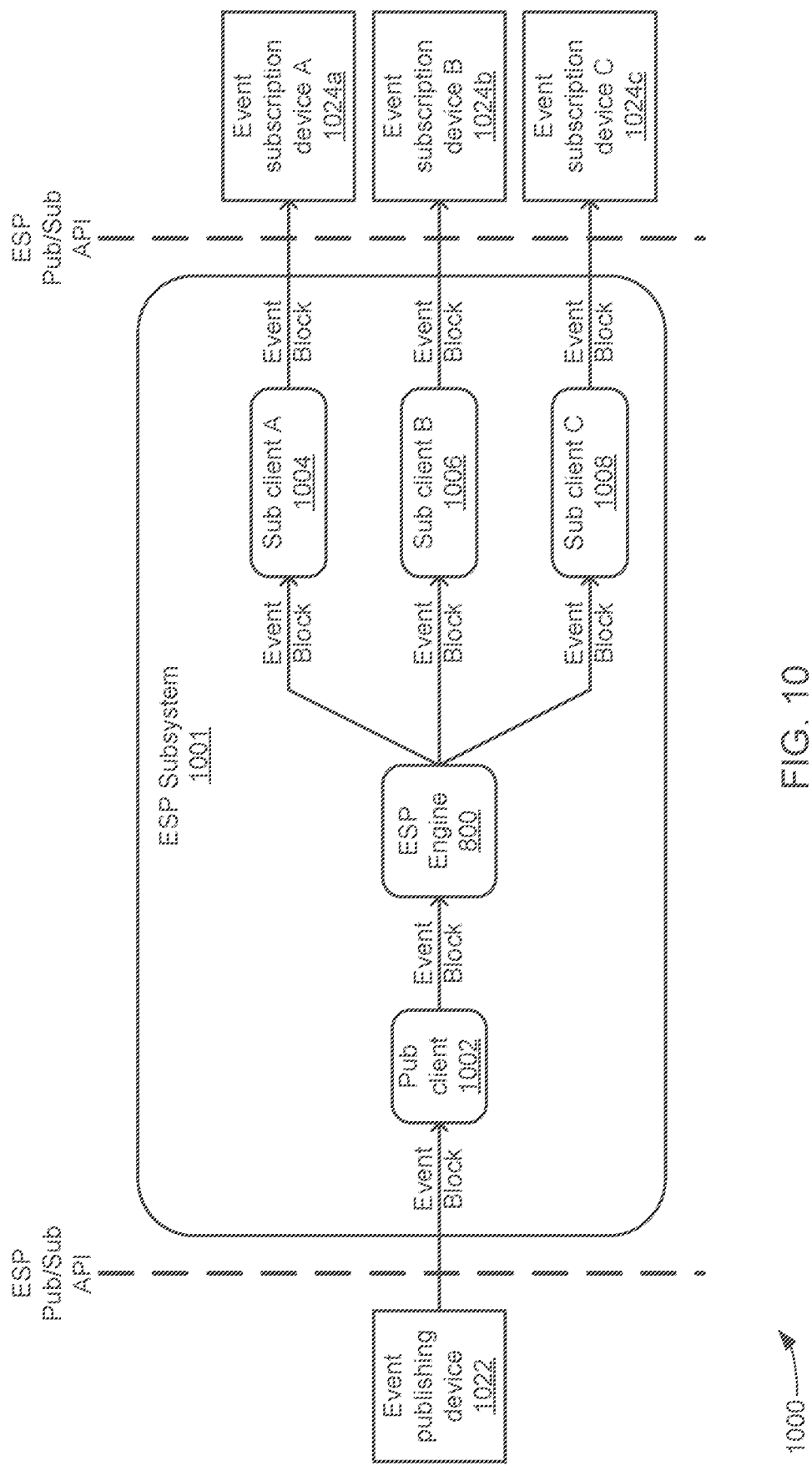
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
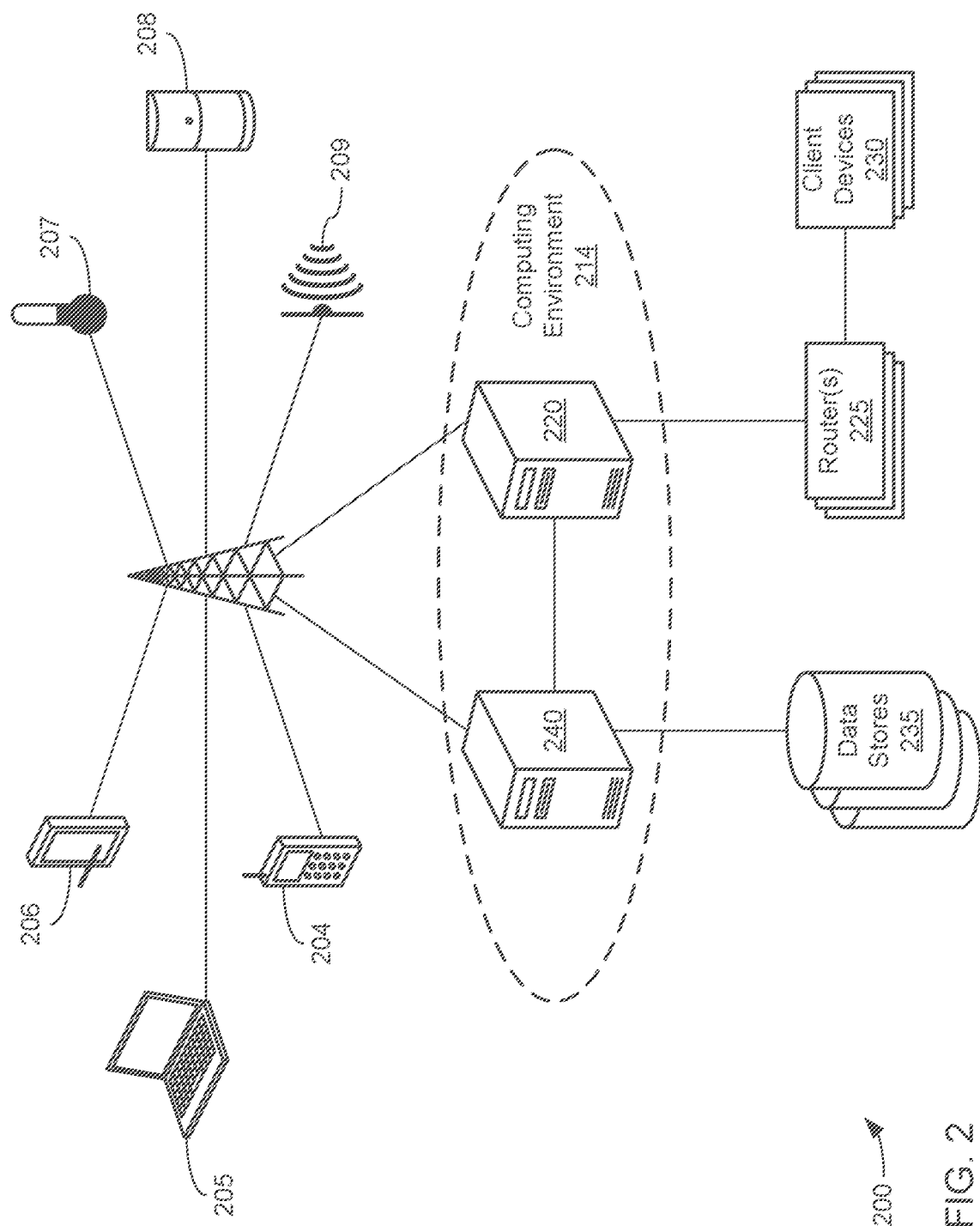
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
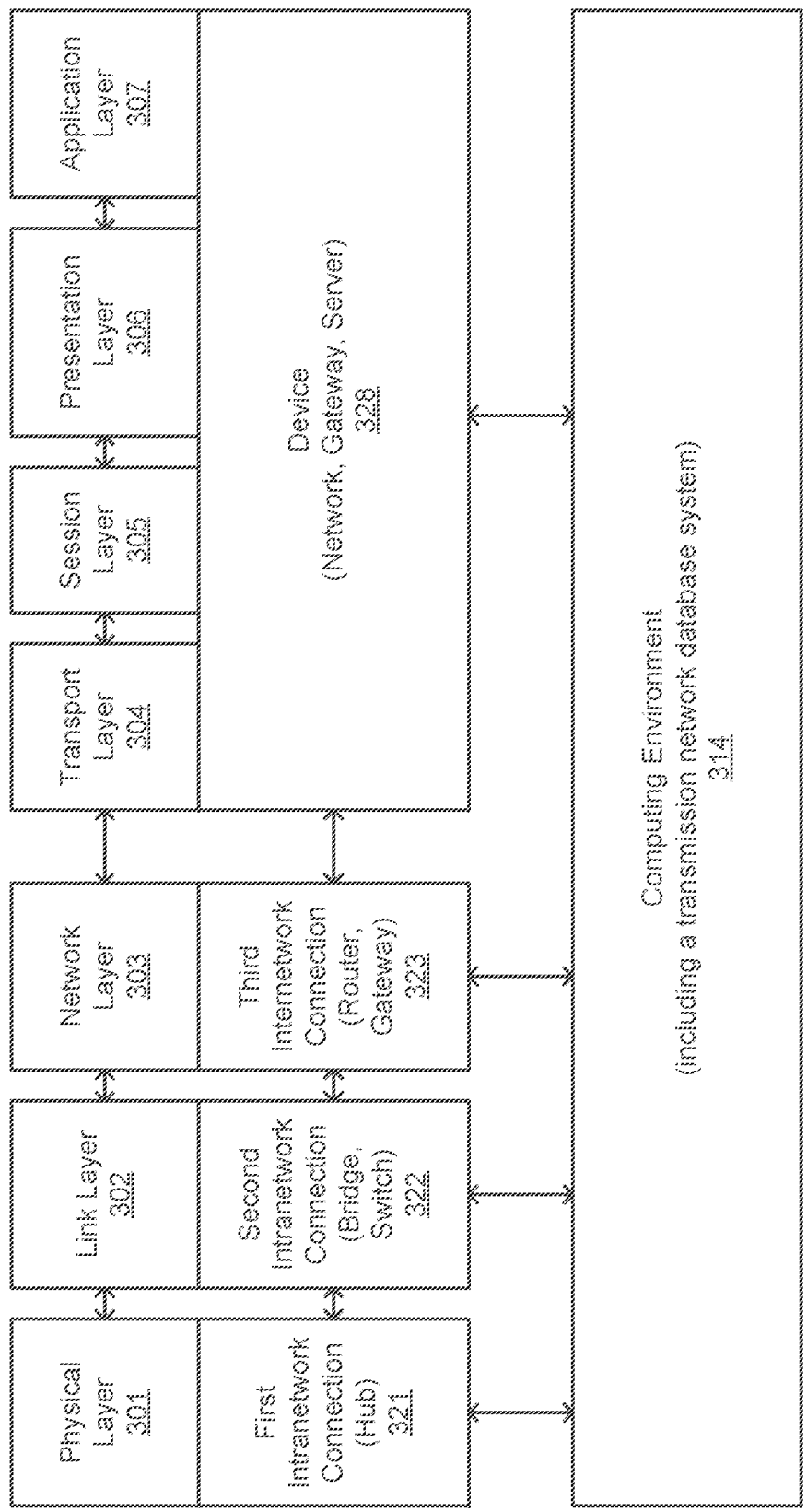
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
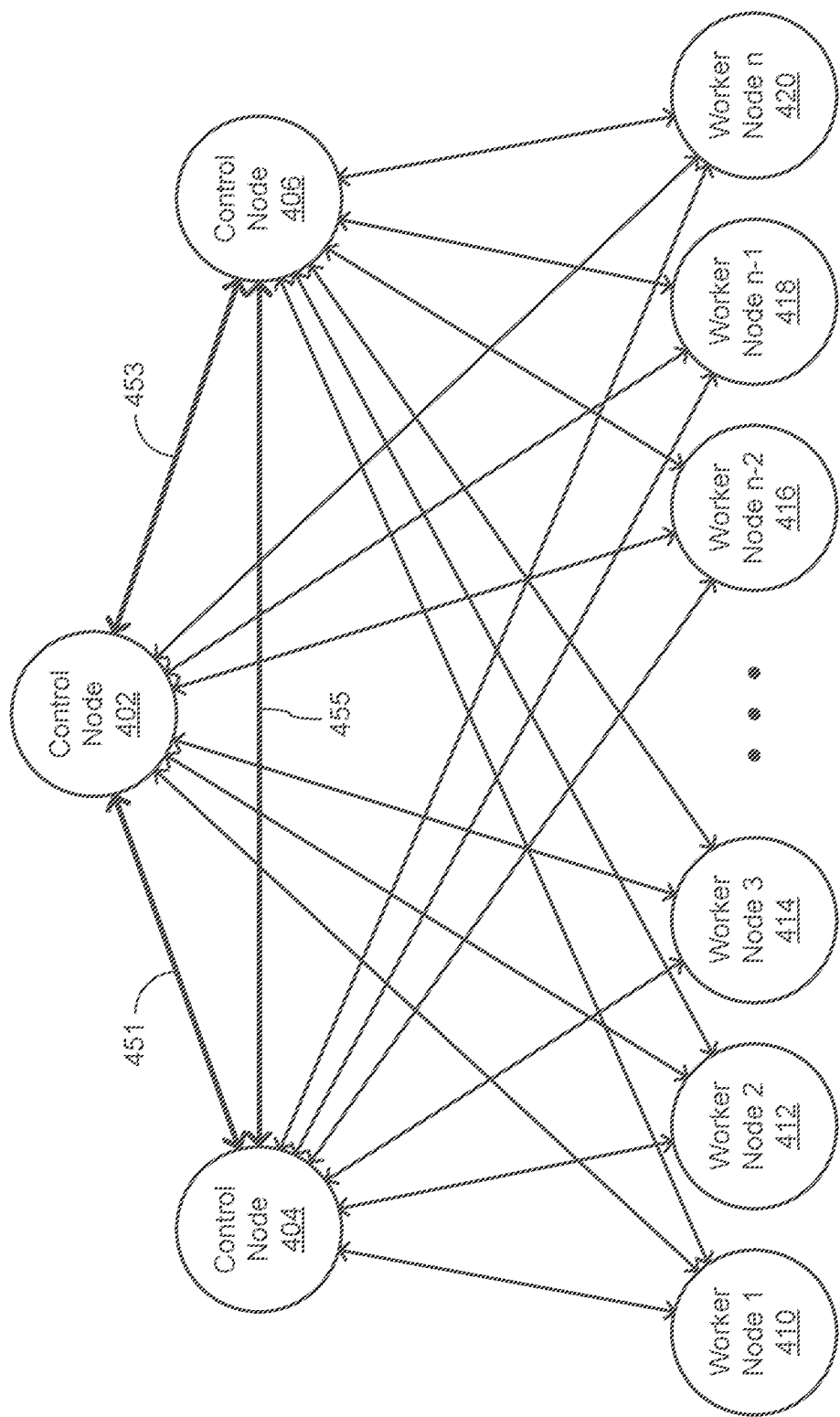
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
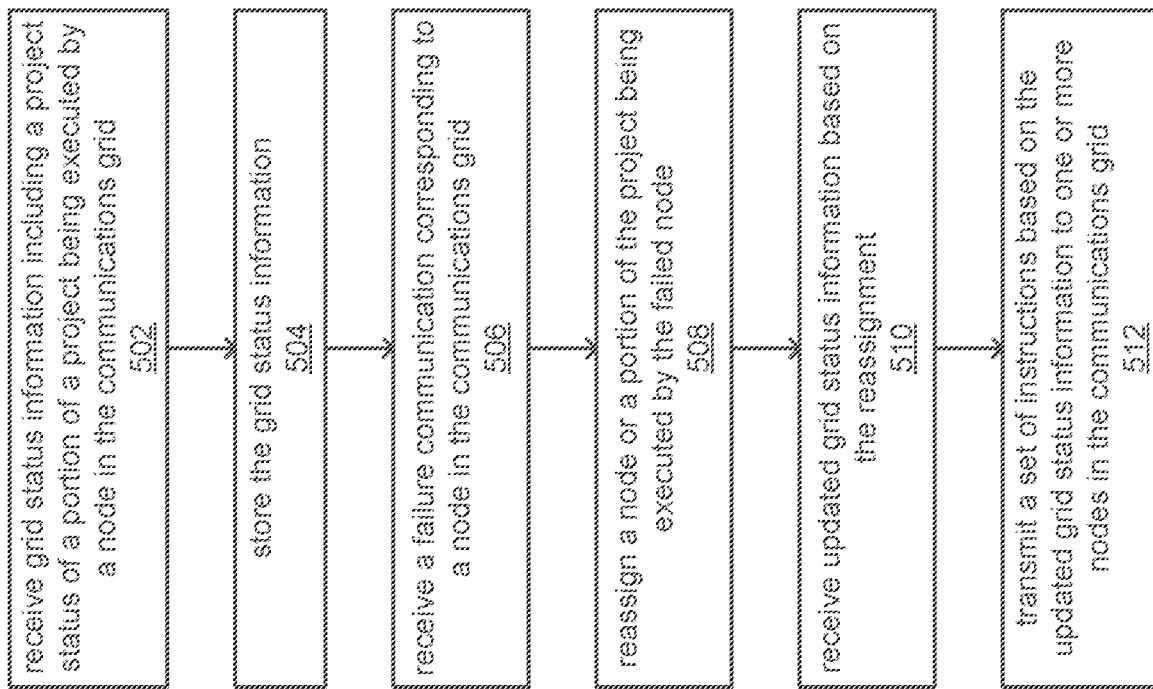
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
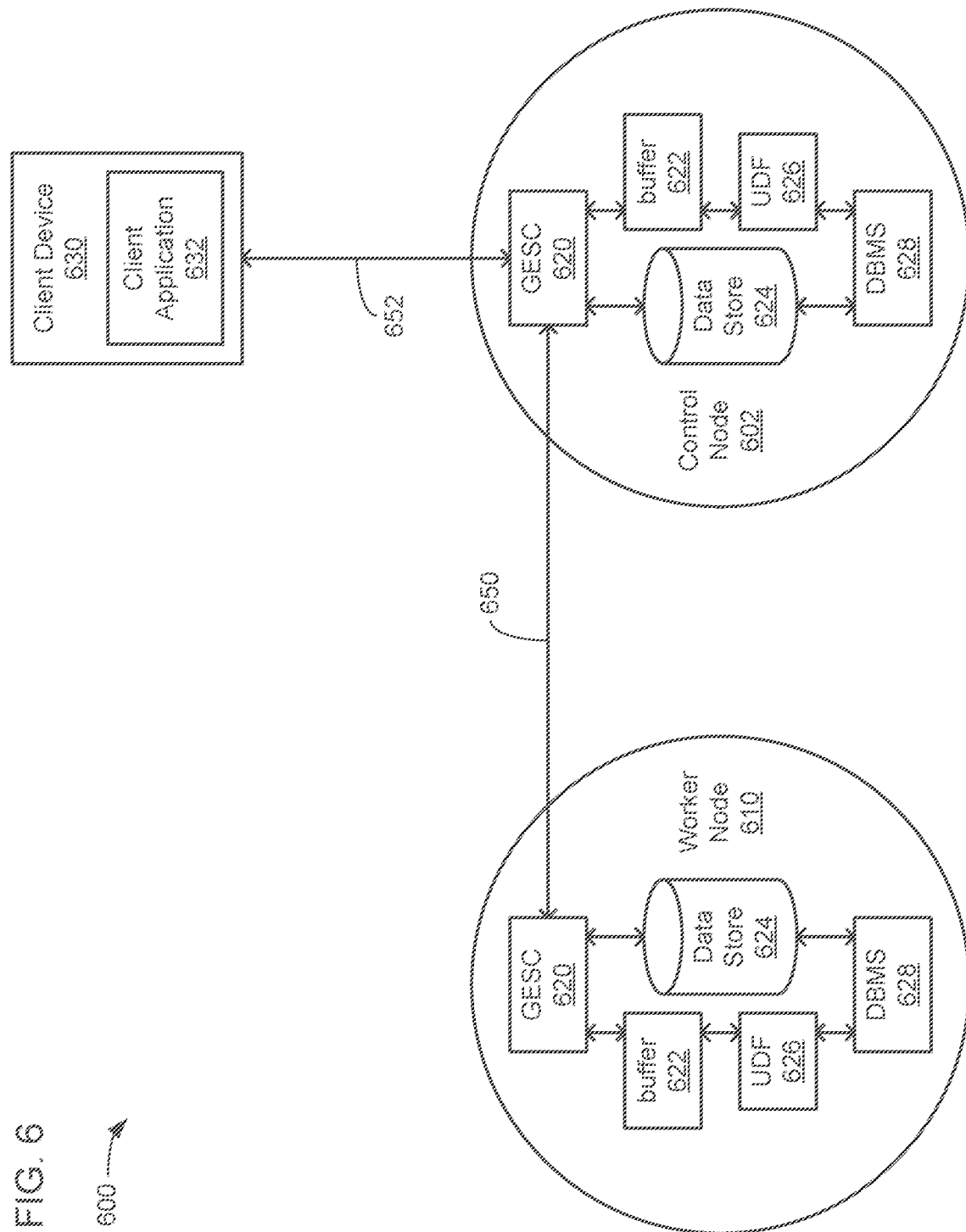
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
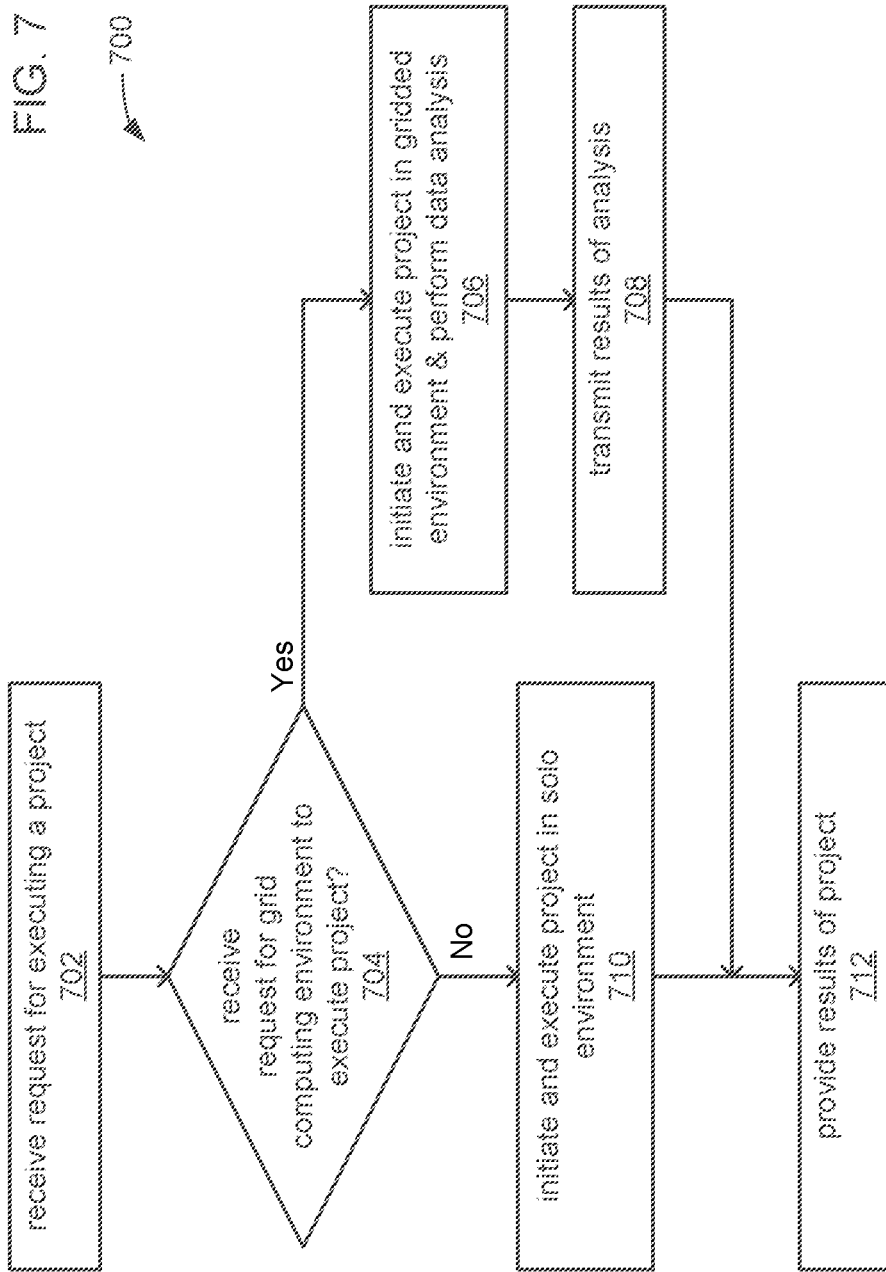
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
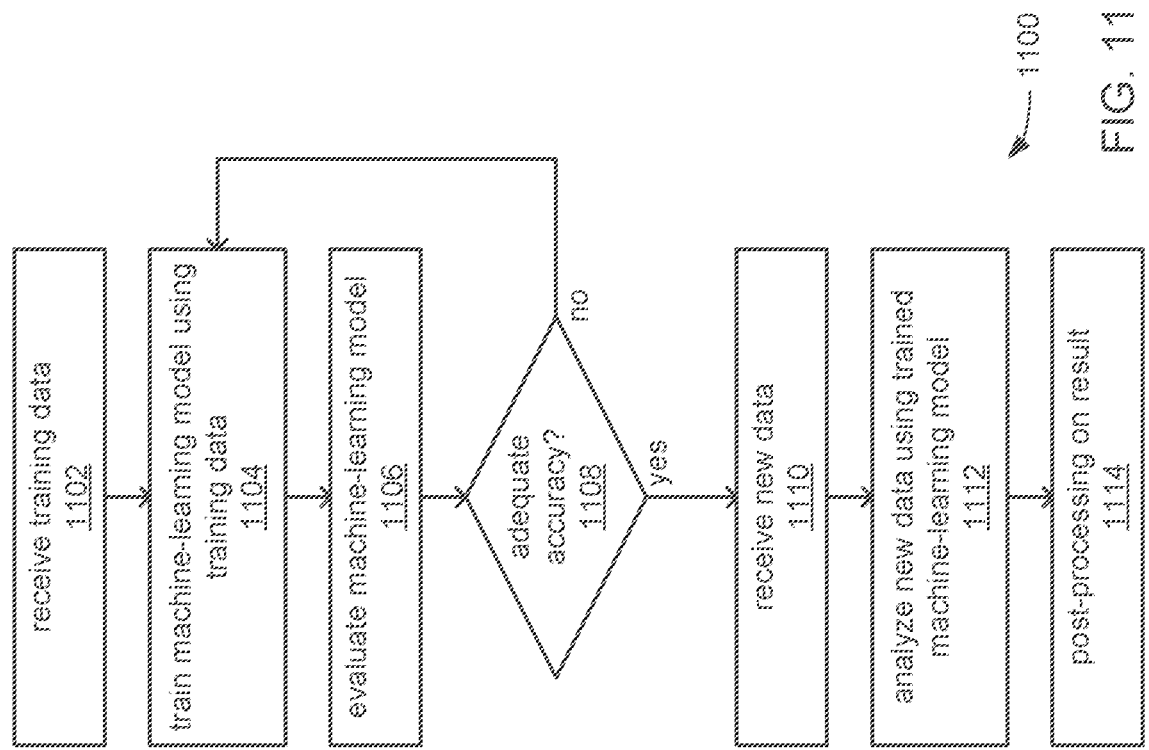
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud customer detection; segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
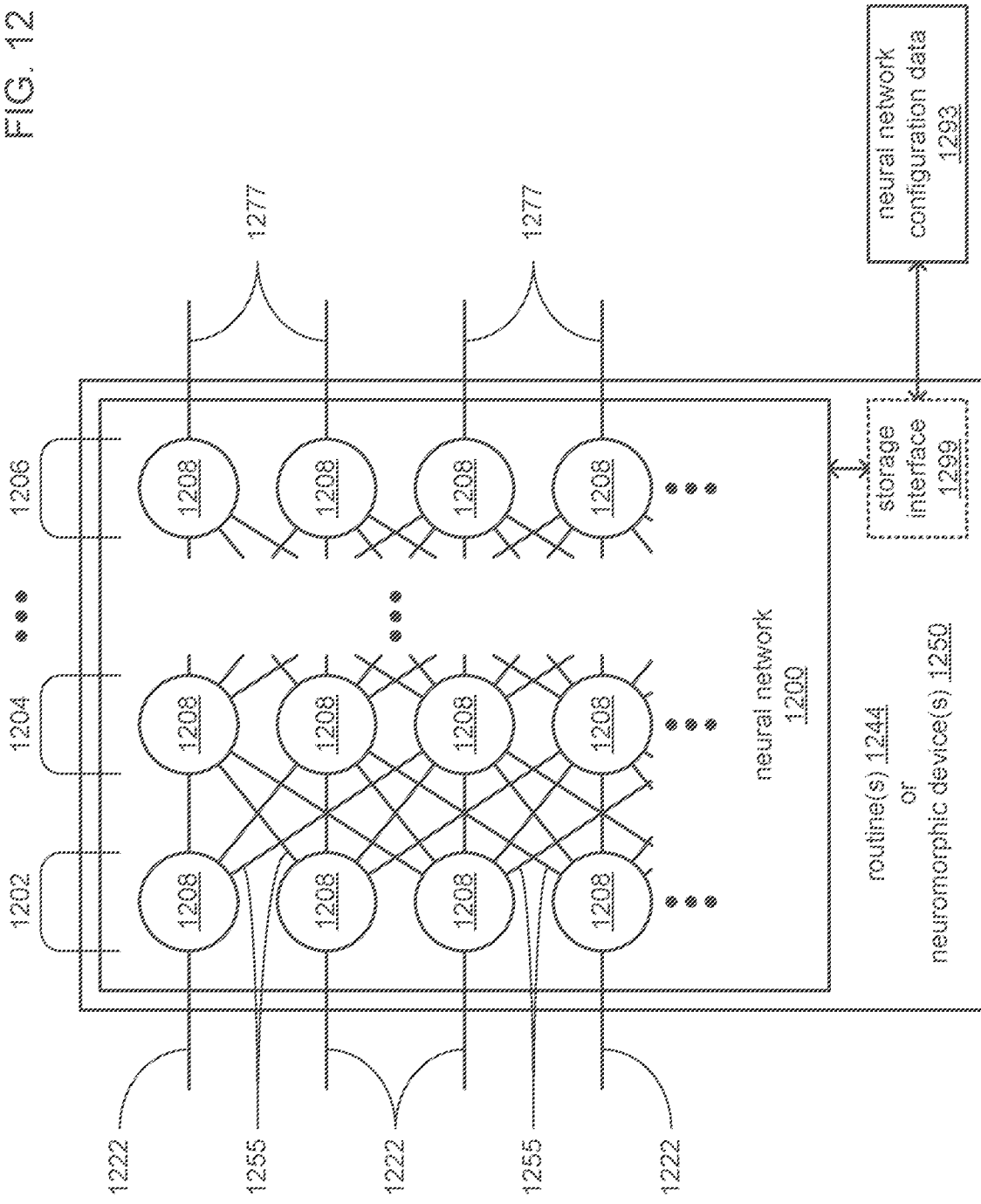
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
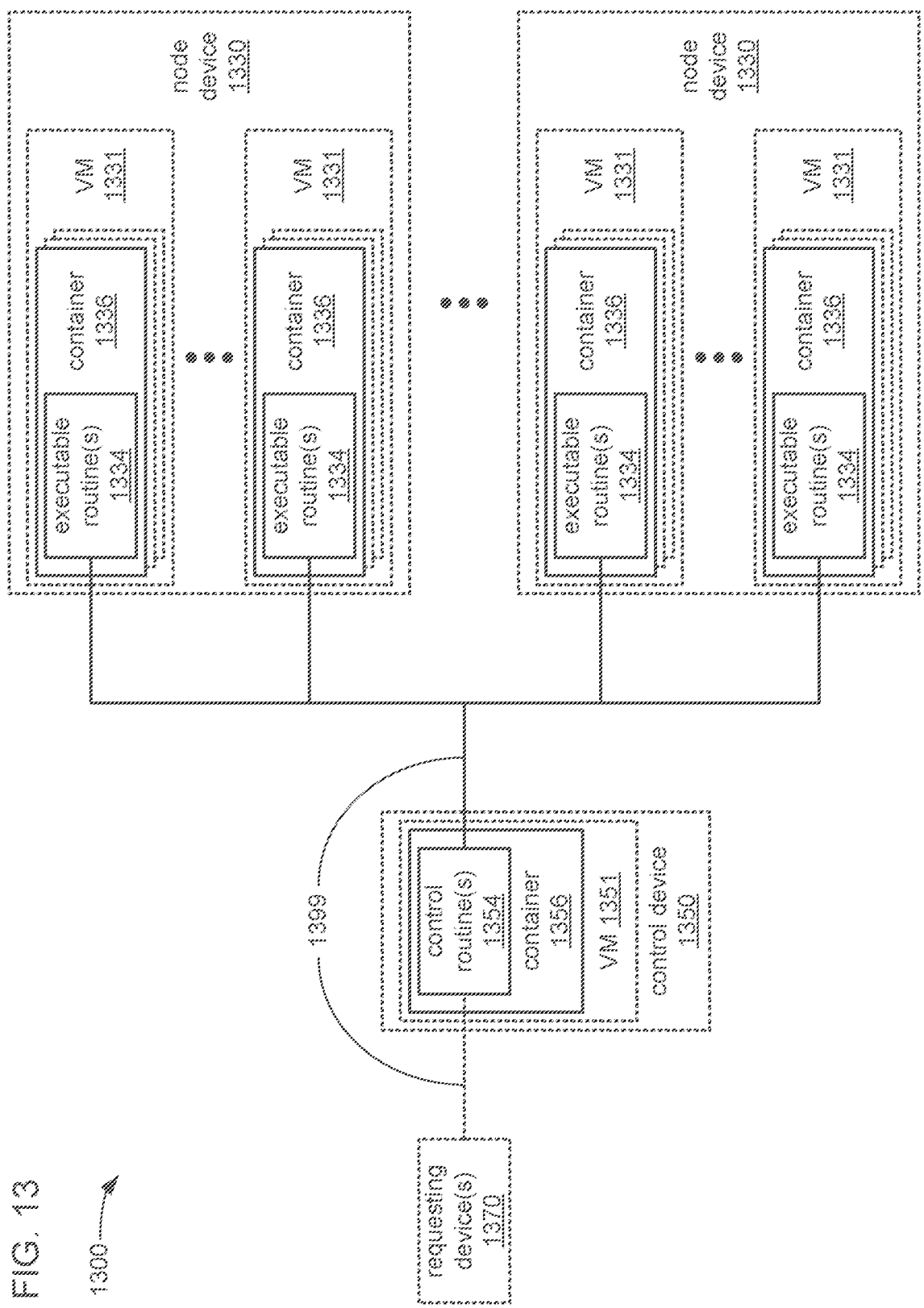
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine

1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
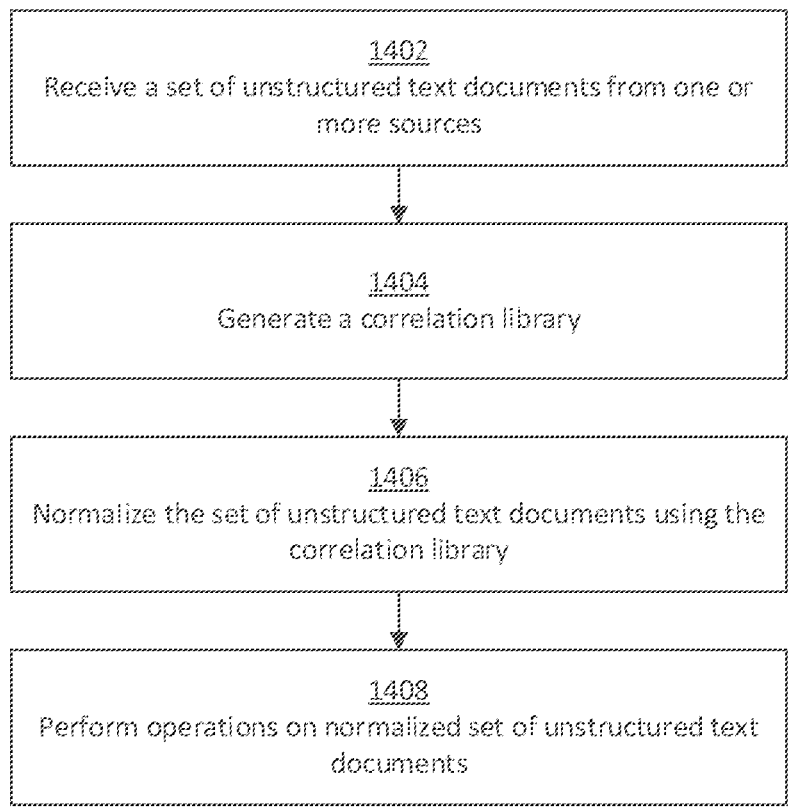
FIG. 14 shows a flowchart of an example of a process for pre-processing unstructured text documents according to some aspects of the present disclosure.

FIG. 14 shows a flowchart of an example of a process for analyzing a set of unstructured text documents according to some aspects of the present disclosure. The process can be implemented using any of the systems and techniques described above. Although FIG. 14 shows a certain sequence of operations for illustrative purposes, it will be appreciated that other examples may involve more operations, fewer operations, different operations, or a different sequence of operations than is shown in FIG. 14.

In block 1402, a system receives a set of unstructured text documents from one or more sources. The sources may include databases, repositories, other computing systems, etc. The unstructured text documents can describe issues with entities—e.g., they can include entity-issue descriptions.

In block 1404, the system generates a correlation library based on the set of unstructured text documents. This may involve, for each text document, identifying any unknown tokens in the text document, selecting an alternative token for each unknown token, and updating the correlation library to include a respective mapping between each unknown token and its selected alternative. The correlation library can be used later on to normalize the set of unstructured text documents, for example by replacing unknown tokens in the text documents with their corresponding alternatives from the correlation library.

In some examples, the correlation library may grow to a size that is too large to normalize the text documents quickly. So, the system may generate a modified correlation library that is smaller in size for use in the normalization process. For instance, the system can select a subset of the correlation library based on a predefined schema, count how many times each unknown token in the subset occurs in the set of unstructured text documents, and generate the modified correlation library such that it only contains the unknown tokens from the subset that occur at least a threshold number of times in the set of unstructured text documents. The modified correlation library may be an updated version of the original correlation library or may be a separate correlation library derived from the original correlation library. Through this process, the system can generate a modified correlation library only contains the unknown tokens that most frequently occur in the set of unstructured text documents. Because those unknown tokens occur most frequently in the set of unstructured text documents, they can be considered the most important tokens and the remainder of the tokens may have relatively little impact on subsequent operations. More details about the process for generating the correlation library are described later on with respect to FIG. 15.

In block 1406, the system normalizes the set of unstructured text documents using the correlation library (e.g., the original or modified correlation library). For example, the system can replace each unknown token in each text document with its corresponding alternative in the correlation library. This can help rid the set of unstructured text documents of unknown tokens and normalize them so that they are using substantially the same set of tokens.

In block 1408, the system performs one or more operations using the normalized set of unstructured text documents. For example, the system can evaluate the normalized set of unstructured text documents to identify POS patterns therein indicative of entities, issues, and connectors. This is described in greater detail later on.

Figure 15:
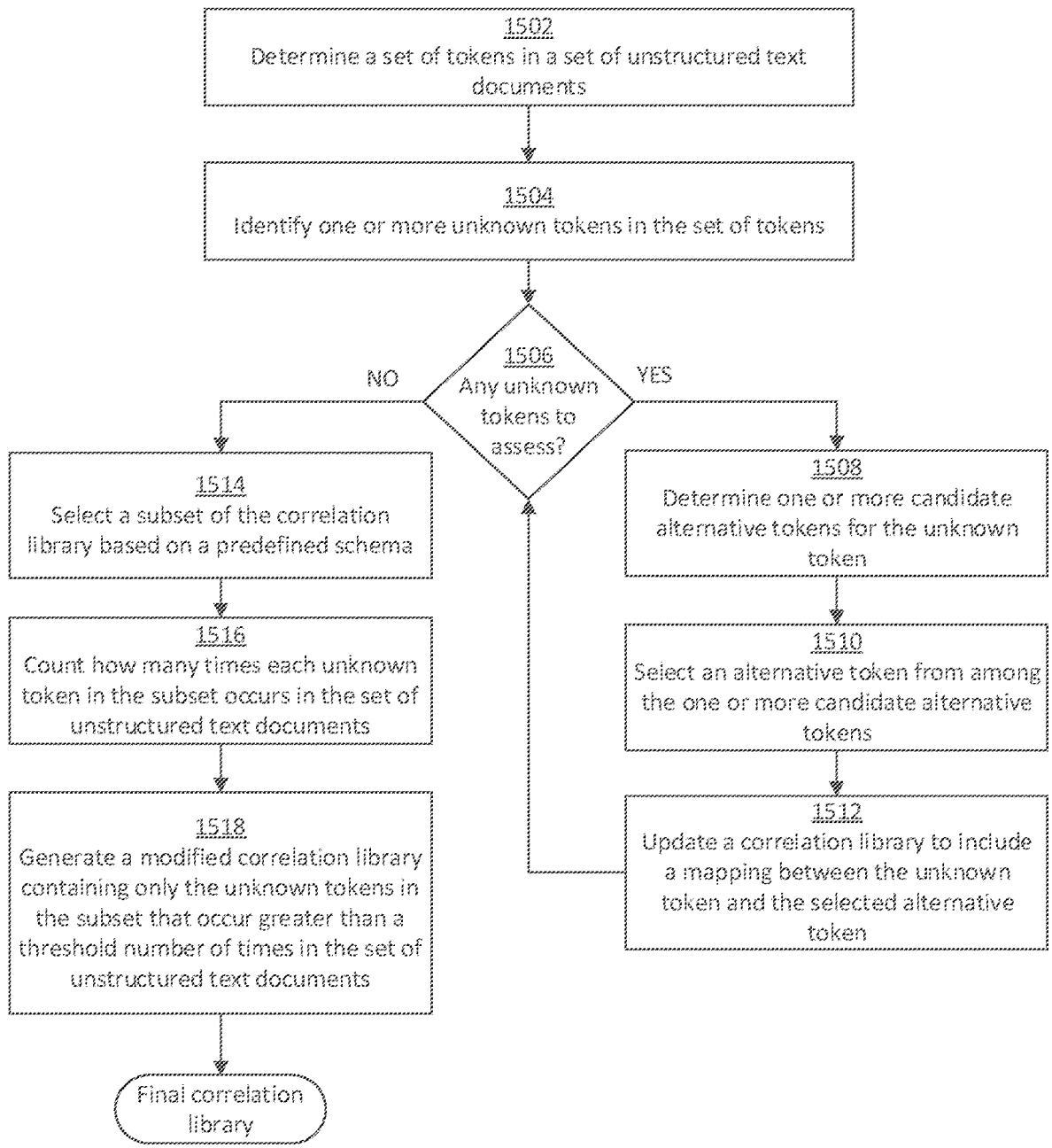
FIG. 15 shows a flowchart of an example of a process for generating a correlation library according to some aspects of the present disclosure.

Further details about the process for generating a correlation library will now be described with respect to FIG. 15. However, it will be appreciated that other examples may involve more operations, fewer operations, different operations, or a different sequence of operations than is shown in FIG. 15.

In block 1502, the system determines a set of tokens in a set of unstructured text documents. This may involve parsing the unstructured text documents into their tokens, for example by using a space as a delimiter. The set of unstructured text documents may or may not be the same as the set of unstructured text documents in block 1402 of FIG. 14.

In block 1504, the system identifies one or more unknown tokens in the set of tokens. For example, the system can compare each token in the set of tokens to a predefined token library. The predefined token library may have, for example, every word in a particular language (e.g., English) as well as some slang or information terms that are commonly used. If a token does not exists in the predefined token library, the system can flag the token as an unknown token.

In block 1506, the system can determine whether there are any unknown tokens to evaluate. If the system identified an unknown token in block 1504, then the process can proceed to block 1508. Otherwise, the process can proceed to block 1514.

In block 1508, the system determines one or more candidate alternative tokens for the unknown token. For example, the system can generate a first candidate alternative token by executing a single-word spelling correction on the unknown token. The single-word spelling correction can return the closest matching word as a result and may use an edit-word strategy to identify the result. This technique can be useful if the token is a misspelled word. The system can generate a second candidate alternative token by executing a word-segmentation technique on the unknown token. The word-segmentation technique can split an unknown token into two or more tokens (e.g., words). For instance, the word-segmentation technique can split a string that excludes any spaces into individual tokens. This may be useful if the unknown token is a combination of multiple tokens without any spaces between the tokens. The system can generate a third candidate alternative token by executing compound-aware multi-word spelling correction on the unknown token. This technique may use compound words that are in an index to try to identify compound words in the unknown token and split them apart. The system can generate a fourth candidate alternative token by executing a word-split method on the unknown token. This technique may attempt to maximize the product of individual probabilities of each token. Other techniques may additionally or alternatively be used to generate the candidate alternative tokens for a given unknown token.

In block 1510, the system selects an alternative token from among the one or more candidate alternative tokens. The system can select the alternative token using a predefined set of rules. In some examples, the predefined set of rules may prioritize among the four techniques described above, such that they are evaluated in a particular order. In one example, the compound-aware multi-word spelling correction technique can be tried first. If it does not yield a candidate alternative token that is suitable, the word-segmentation technique may be tried second. If it does not yield a candidate alternative token that is suitable, the word-split method may be tried third. If it does not yield a candidate alternative token that is suitable, the single word spelling correction may be tried fourth. Of course, other examples may involve a different order of the various techniques.

To determine whether a candidate alternative token is suitable, the candidate alternative token may be evaluated in one or more ways. For example, spaces may be removed from the candidate alternative token, and the modified candidate alternative token can be compared to the original input unknown token to determine whether they match one another. As another example, spaces may be removed from the candidate alternative token, the length of the modified candidate alternative token may be determined, and that length may be compared to the length of the original input unknown token to determine whether they match one another. If either of these approaches yields a match, the candidate alternative token may be deemed suitable.

In block 1512, the system updates a correlation library to include a mapping (e.g., correlation) between the unknown token and the selected alternative token. For example, the system can add the mapping to the correlation library.

The system can return to block 1506, at which point it can determine whether all unknown tokens have been evaluated. If there are still unknown tokens to evaluate, the system can repeat blocks 1508-1512 for the next unknown token. Otherwise, the process can continue to block 1514.

In block 1514, the system selects a subset of the correlation library based on a predefined schema, which may be input by the user. The selected subset can include the unknown tokens that correspond to (e.g., are part of) the predefined schema. The subset may exclude a remainder of the unknown tokens in the correlation library that do not correspond to the predefined schema.

In block 1516, the system counts how many times each unknown token, in the selected subset of the correlation library, occur in the set of unstructured text documents. For example, the system can count how many times the unknown token "sus," which can be short for "suspicious," occurs in the set of unstructured text documents.

In block 1518, the system generates a modified correlation library containing only the unknown tokens (from the selected subset) that occur at least a threshold number of times in the set of unstructured text documents. For example, if the threshold is 7 times and the term "sus" occurs 9 times in the set of unstructured text documents, the system can maintain the term "sus" in the correlation library along with its corresponding alternative. On the other hand, if the threshold is 7 times and the term "sus" occurs 3 times in the set of unstructured text documents, the system can exclude the term "sus" from the correlation library along with its corresponding alternative. This can help trim down the size of the correlation library, so that it takes up less memory and is faster to use in the subsequent normalization process. At the end of this process, the system may have its final correlation library for use in the normalization process.

Figure 16:
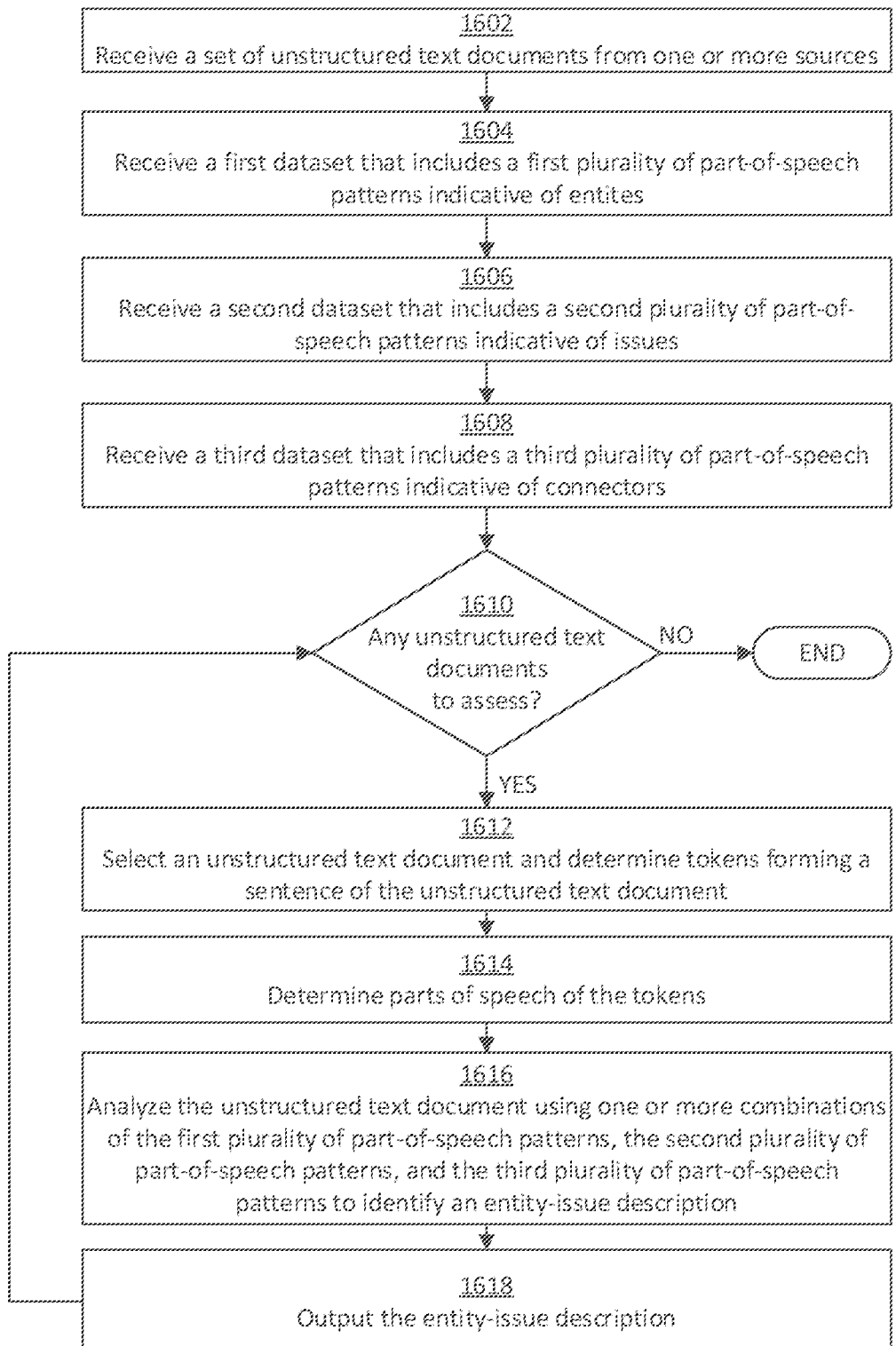
FIG. 16 shows a flowchart of an example of a process for generating part-of-speech datasets based on a set of unstructured text documents according to some aspects of the present disclosure.

As noted above, after the correlation library is generated, the system can use the correlation library to normalize a set of unstructured text documents. The system may then perform a content analysis process on the normalized set of unstructured text documents to derive POS patterns that are indicative of entities, issues, and connectors. That content analysis process will now be described in greater detail with respect to FIG. 16. However, it will be appreciated that other examples may involve more operations, fewer operations, different operations, or a different sequence of operations than is shown in FIG. 16.

In block 1602, the system receives a set of unstructured text documents from one or more sources. The set of unstructured text documents may or may not be the same as the set of unstructured text documents in block 1402 and/or block 1502. The sources may include databases, repositories, other computing systems, etc. The unstructured text documents can describe issues with entities—e.g., they can include entity-issue descriptions.

In block 1604, the system receives a first dataset that includes a first plurality of part-of-speech patterns indicative of entities. The system can receive the first dataset from a database, repository, or other suitable source. The first dataset may have been previously created, for example by an analyst (e.g., a human analyst) upon evaluating a sample set of unstructured text documents. For instance, the analyst can determine that the word "turbine" is the entity in the sentence "the turbine is broken." The analyst can also determine that the word "turbine" is a noun. Therefore, the analyst can determine that a first POS pattern indicative of an entity is a noun. This is a relatively simple example, but in more complex cases the first POS pattern may involve a sequence of multiple parts-of-speech. The analyst can then add this POS pattern to the first dataset. This process can be repeated for multiple unstructured text documents in the sample set to develop the first dataset. Because the first dataset includes POS patterns that are indicative of entities, it may be referred to as an entity POS dataset.

In block 1606, the system receives a second dataset that includes a second plurality of part-of-speech patterns indicative of issues. The system can receive the second dataset from a database, repository, or other suitable source. The second dataset may have been previously created, for example by an analyst (e.g., a human analyst) upon evaluating a sample set of unstructured text documents. For example, the analyst can determine that the word "broken" is the issue in the sentence "the turbine is broken." The analyst can also determine that the word "broken" is an adjective. Therefore, the analyst can determine that a second POS pattern indicative of an issue is an adjective. This is a relatively simple example, but in more complex cases the second POS pattern may involve a sequence of multiple parts-of-speech. The analyst can then add this POS pattern to the second dataset. This process can be repeated for multiple unstructured text documents in the sample set to develop the second dataset. Because the second dataset includes POS patterns that are indicative of issues, it may be referred to as an issue POS dataset.

In block 1608, the system receives a third dataset that includes a third plurality of part-of-speech patterns indicative of connectors. The system can receive the third dataset from a database, repository, or other suitable source. The third dataset may have been previously created, for example by an analyst (e.g., a human analyst) upon evaluating a sample set of unstructured text documents. For example, the analyst can determine that the word "is" is the connector in the sentence "the turbine is broken." Therefore, the analyst can determine that a third POS pattern indicative of a connector is a verb. This is a relatively simple example, but in more complex cases the third POS pattern may involve a sequence of multiple parts-of-speech. The analyst can then add this POS pattern to the third dataset. This process can be repeated for multiple unstructured text documents in the sample set to develop the third dataset. Because the third dataset includes POS patterns that are indicative of connectors, it may be referred to as a connector POS dataset.

In block 1610, the system determines whether there are any unstructured text documents that need to be evaluated. If so, the process can continue to block 1612. Otherwise, the process can end.

In block 1612, the system selects an unstructured text document for evaluation and determines tokens forming a sentence of the unstructured text document. This may involve parsing the sentence into the tokens using a parser. The parser may be configured to use a space or another token as a delimiter.

In block 1614, the system determines the parts-of-speech of the tokens. This may involve executing a POS analyzer to determine the parts-of-speech corresponding to the tokens in the sentence. In some examples, the POS analyzer can be a trained machine-learning model that is configured to determine a POS for each token in a sentence, for example based on context.

In block 1616, the system analyzes the unstructured text documents using one or more combinations of the first plurality of part-of-speech patterns, the second plurality of part-of-speech patterns, and the third plurality of part-of-speech patterns. For instance, the system previously determined the parts-of-speech of the tokens in the unstructured text document in block 1614. So, the system can analyze those parts-of-speech and their sequences for matches to one or more combinations of the first plurality of part-of-speech patterns, the second plurality of part-of-speech patterns, and the third plurality of part-of-speech patterns. By performing this analysis, the system may identify an entity-issue description in the unstructured text document.

In block 1618, the system can output the entity-issue description that was identified in the unstructured text document, for example in a graphical user interface or to a remote device.

The process may then return to block 1610, where the system can select another unstructured text document from the set of unstructured text documents for evaluation. When there are no unstructured text documents left to evaluate, the process can end.

Figure 18:
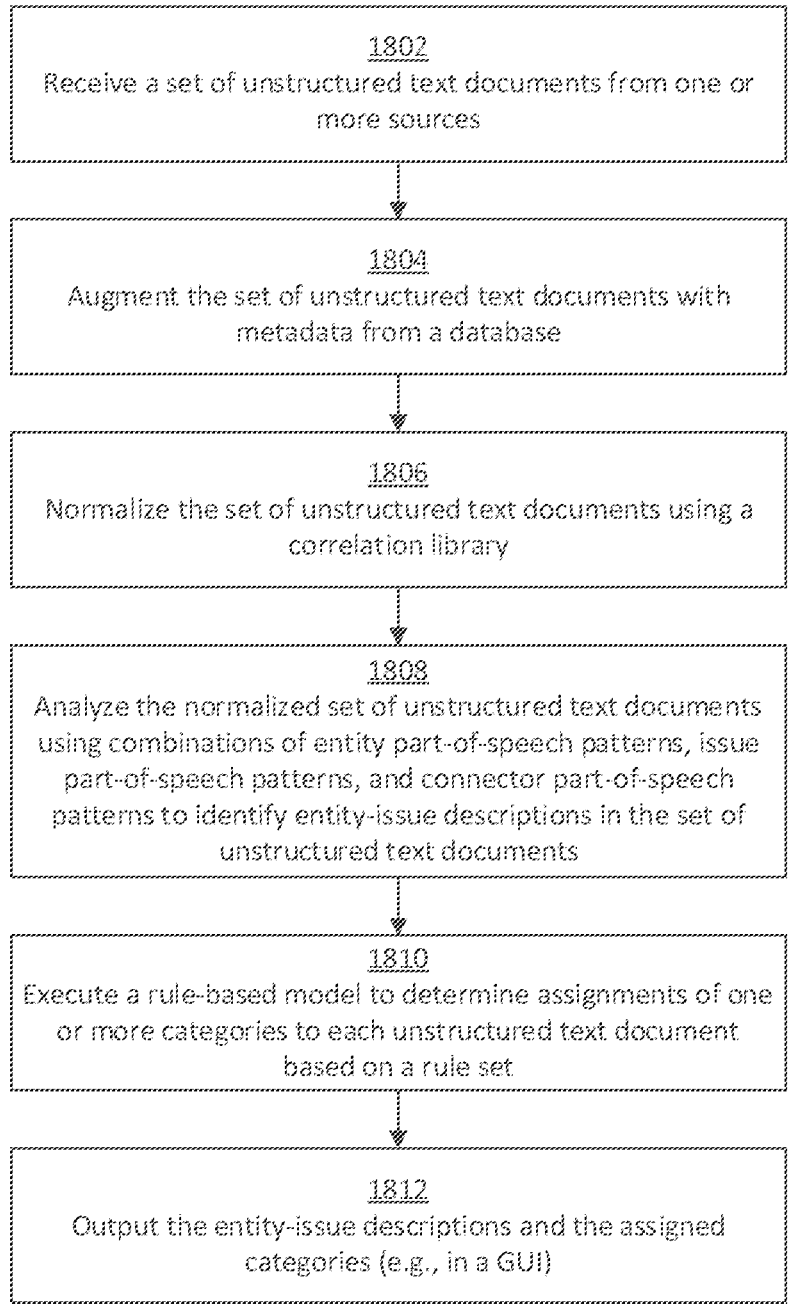
FIG. 18 shows a flowchart of an example of a process for determining entity-issue descriptions and category assignments associated with a set of unstructured text documents according to some aspects of the present disclosure.

One example of the POS matching process is shown in FIG. 17. As shown, the system can determine the parts-of-speech 1702 corresponding to tokens in unstructured text documents 1704. The system can then compare the parts-of-speech 1702 against the entity POS dataset 1706, the issue POS dataset 1708, and the connector POS dataset 1710 to identify matches. More details about this matching process will now be described in greater detail with respect to FIG. 18. However, it will be appreciated that other examples may involve more operations, fewer operations, different operations, or a different sequence of operations than is shown in FIG. 18.

In block 1802, the system receives a set of unstructured text documents from one or more sources. The set of unstructured text documents may or may not be the same as the set of unstructured text documents in block 1402, block 1502, and/or 1602. The sources may include databases, repositories, other computing systems, etc. The unstructured text documents can describe issues with entities—e.g., they can include entity-issue descriptions.

In block 1804, the system augments the set of unstructured text documents with metadata from a database. This can involve incorporating the metadata into one or more of the unstructured text documents. The metadata can be related to the unstructured text documents in the database and is different than the content of the unstructured text documents.

In block 1806, the system normalizes the set of unstructured text documents using a correlation library. This may involve detecting unknown tokens in the set of unstructured text documents and replacing the unknown tokens with their counterparts in the correlation library. Each unknown token can be mapped to a single counterpart in the correlation library.

In block 1808, the system analyzes the normalized set of unstructured text documents using combinations of entity POS patterns, issue POS patterns, and connector POS patterns, to identify entity-issue descriptions in the set of unstructured text documents.

For example, the system can generate various combinations of the entity POS patterns, issue POS patterns, and connector POS patterns based on a predefined set of rules.

The rules can indicate difference sequences of the entity POS patterns, issue POS patterns, and connector POS patterns. Each combination can include a single entity POS pattern selected from among the entity POS patterns. Each combination can also include a single issue POS pattern selected from among the issue POS patterns. Each combination can further include a single connector POS pattern selected from among the connector POS patterns. The entity POS pattern, issue POS pattern, and connector POS pattern can then be arranged in a particular sequence based on the predefined set of rules. Each of the combinations can be different from the rest of the combinations, such each combination is a unique sequence of an entity POS pattern, a connector POS pattern, and an issue POS pattern. Additionally, the system can determine (e.g., using a POS analyzer) the parts-of-speech of the tokens in a given text document. The system can then compare each of the combinations to the parts-of-speech of the tokens in the text document to determine whether they match. If a match is detected, the system can determine that the sequence of tokens in the text document corresponds to an entity-issue description. The system can then extract the entity, the issue, and the connector from the text document and store them for subsequent use. The system can repeat this process for some or all of the text documents in the normalized set of unstructured text documents to identify the entity-issue descriptions.

Figure 19:
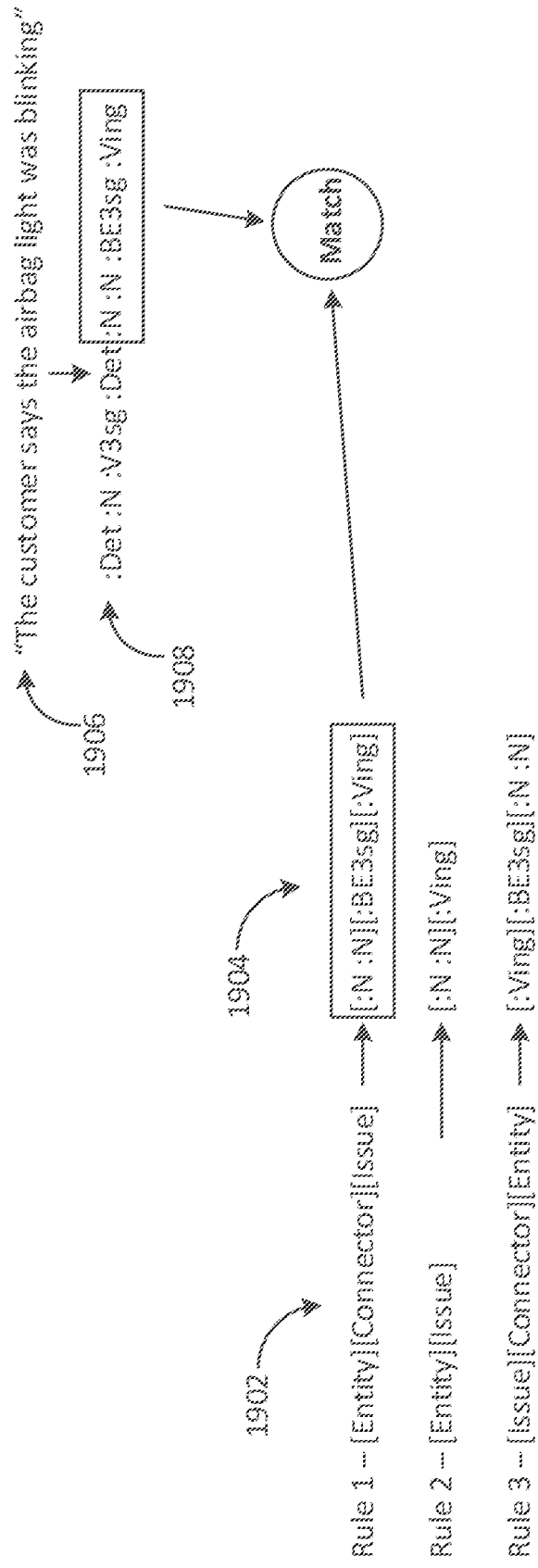
FIG. 19 shows an example of a process for developing combinations of part-of-speech patterns based on rules according to some aspects of the present disclosure.

One example of the above process is shown in FIG. 19. In this example, the text document 1906 can include the sentence "The customer says the airbag light was blinking." The system can convert that sentence it its corresponding POS sequence 1908, which in this example is [:Det :N :V3sg :Det :N :N :BE3sg :Ving], where "Det" represents a determiner, "N" represents a noun, "V" represents a verb, "3sg" represents a tense, and "BE" represents a form of the verb "to be." The system can also generate various combinations of the entity POS patterns, issue POS patterns, and connector POS patterns based on a predefined set of rules. Each rule can indicate a sequential order in which the entity POS pattern, issue POS pattern, and connector POS pattern are to be arranged in a respective combination. In this example, there are three rules 1902 that organize the entity POS patterns, issue POS patterns, and connector POS patterns in different ways from one another. Using those rules, the system can generate at least three different sequences 1904 of the entity POS patterns, issue POS patterns, and connector POS patterns. The system can then compare those sequences to the POS sequence 1908 in the text document 1906 to identify any matches. In this example, the phrase "airbag light was blinking" has a part-of-speech sequence that matches the first rule. So, the system can identify that phrase as an entity-issue description. It will be appreciated that this example is relatively simple for illustrative purposes, but other examples may involve dozens of rules and numerous permutations of the same rule based on the different entity POS patterns, issue POS patterns, and connector POS patterns that are available for selection. For instance, there may be dozens of permutations of the first rule depending on how many entity POS patterns, issue POS patterns, and connector POS patterns were previously identified, with each permutation having a different entity POS pattern, issue POS pattern, or connector POS pattern from the other permutations.

Continuing with FIG. 18, in block 1810, the system executes a rule-based model to assign one or more predefined categories (e.g., of a predefined schema) to each unstructured text document of the set of unstructured text documents. The rule-based model may apply a predefined set of rules to categorize each unstructured text document (e.g., the original or normalized unstructured text document) into one or more categories based on the content of the unstructured text document. For example, the rule-based model may categorize an unstructured text document based on one or more keywords in the unstructured text document. The predefined set of rules may correlate the keywords to the categories, so that the rule-based model knows which categories to assign to a given text document based on the keywords in that text document.

In block 1812, the system outputs the entity-issue descriptions and the assigned categories associated with each unstructured text document in the set of unstructured text documents. In some examples, the system can output the entity-issue descriptions and the assigned categories in a graphical user interface (GUI). The user may be able to interact with the GUI to view a given text document, manually modify the categories assigned to a given text document, and/or perform other operations with respect to a given text document.

Figure 20:
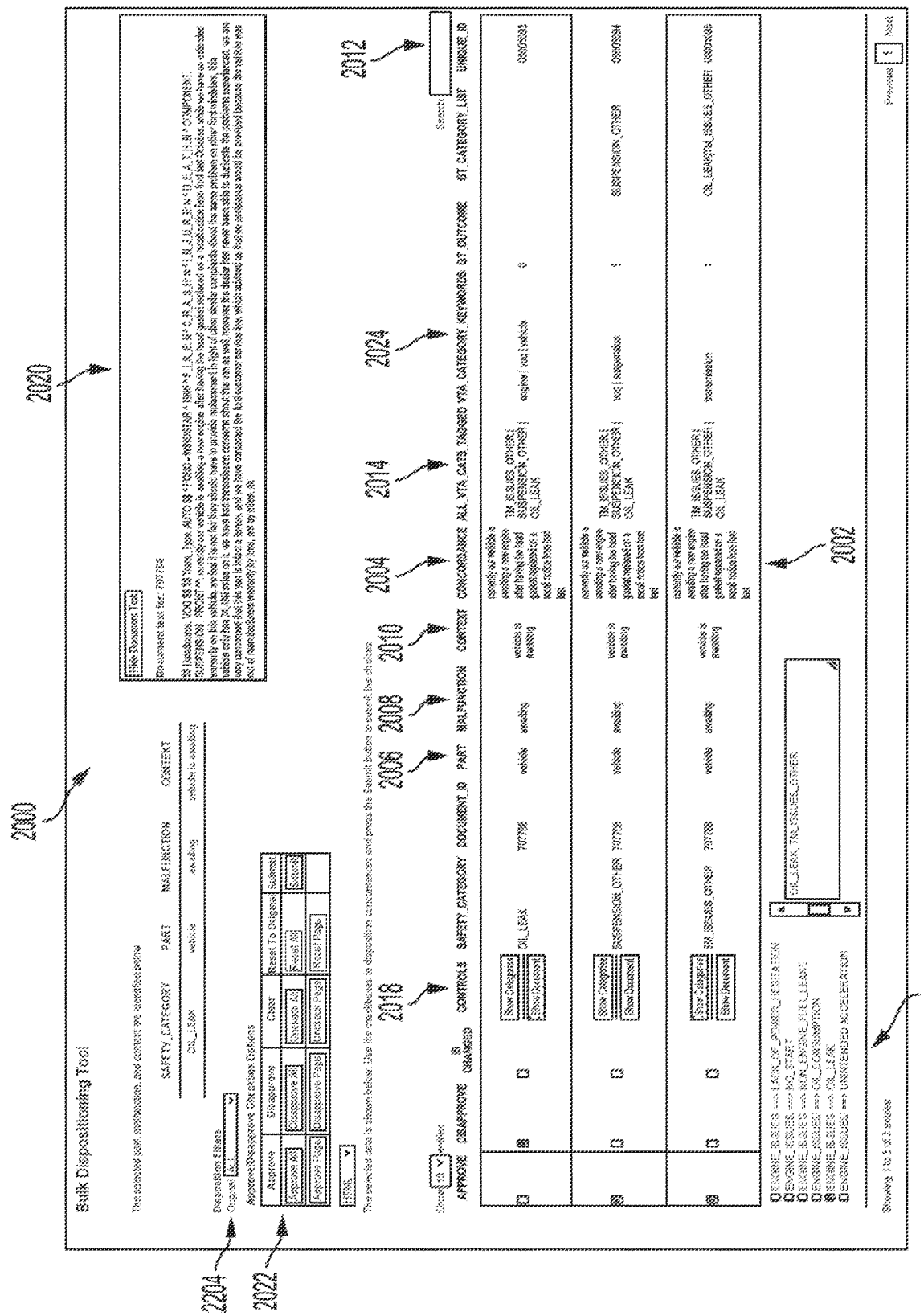
FIG. 20 shows an example of a graphical user interface according to some aspects of the present disclosure.

One example of the GUI is shown in FIG. 20. As shown, the GUI 2000 can include a table 2002 of rows, where each row of the table 2002 corresponds to one of the unstructured text documents. Each row indicates a respective entity-issue description 2010 in the corresponding unstructured text document. Each row may also separately indicate the entity 2006 and the issue 2008 associated with the entity-issue description 2010, which may make the visible rows easier to search or filter (e.g., using search box 2012). Each row may further include a snippet of text surrounding the entity-issue description 2010, which may provide additional contextual information related to the entity-issue description. Each row may additionally indicate one or more categories 2014 of a predefined schema 2016 assigned to the corresponding text document, for example by a user and/or a rule-based model. In some examples, each row may have two distinct columns indicating a first set of categories assigned to the text document by a user and a second set of categories assigned to the text document by the rule-based model. If the categories 2014 were at least partially assigned by the rule-based model, each row may indicate one or more keywords 2024 from the corresponding text document that caused the rule-based model to select the assigned categories. This may help the user understand why the rule-based model made it selections.

Each row of the graphical user interface 2000 can further include controls 2018. The controls 2018 can include a graphical button that is selectable to allow the user to selectively view the unstructured text document corresponding to the row. For example, upon selecting the "Show Document" button in the first row, a window 2020 may be displayed with at least some of the content of the corresponding unstructured text document. This may allow the user to dig deeper into the content of the unstructured text document, for example to determine whether its assigned categories are correct.

The user may be able to approve, disapprove, or change the categories assigned to a text document. For example, the user can select the "approve" box in a row of the GUI 2000 to approve the categories assigned to the text document. As another example, the user can select the "disapprove" box in a row of the GUI 2000 to disprove the categories assigned to the text document. As still another example, the user can select one or more categories from the predefined schema 2016 to apply to a given text document, for example to change the categories assigned to the text document. If the user changes the categories assigned to a given text document, the system can store a corresponding change record in a change log. The change log can indicate manual changes to the category assignments over time by one or more users to help track such changes. If the user wishes to bulk approve or bulk disapprove the category assignments for multiple text documents, the user can select the "approve all" button or the "disapprove all" button in the bulk controls area 2022.

In some examples, the GUI 2000 can include graphical visualizations indicating how many times a particular entity, issue, and/or entity-issue description occurs in the set of unstructured text documents (e.g., the frequency of a particular entity, issue, and/or entity-issue description in the set of unstructured text documents). For example, the GUI 2000 can include word clouds, bar graphs, pie charts, or other visualizations indicating this information. This may help the user better understand which entities and issues are the most frequent cause of concern.

In some examples, the GUI 2000 can also include a filtering option 2026 that is selectable to filter the text documents based on a selected category, such that only the text documents assigned to the selected category are displayed in the GUI 2000. This can help the user quickly search for relevant text documents.

Once the user has approved the categorizations and/or made any necessary changes to them, the user may select a first button to automatically tune the rule-based engine based on the assigned categories. In response, the system can adjust one or more properties of the rule-based model based on the assignments of the categories to the text documents, to help improve the rule-based model's performance in the future. Additionally or alternatively, the user can select a second button to automatically generate training data based on the assignments of the categories to the text documents. The system may then use the training data in a supervised or semi-supervising training process to train a machine-learning model, so that the machine-learning model can be used in the future to automatically assign the categories to input text documents. Such a machine-learning model may be more accurate than the rule-based model, though it may also consume more computing resources than the rule-based model.

Figure 21:
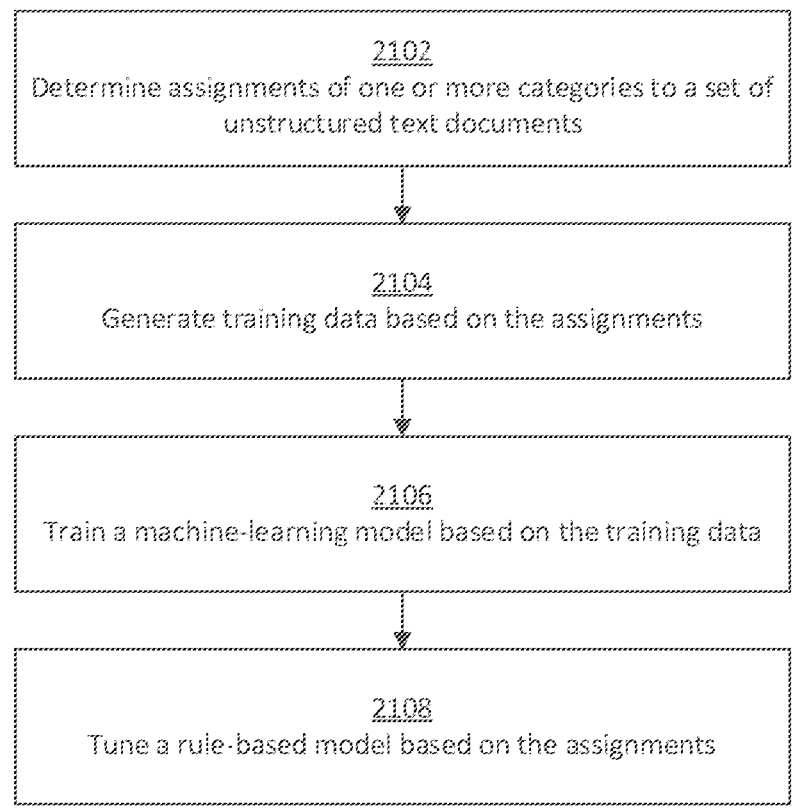
FIG. 21 shows a flowchart of an example of a process for training a machine-learning model and tuning a rule-based model based on category assignments for unstructured text documents according to some aspects of the present disclosure.

One example of the tuning and training processes is shown in FIG. 21. However, it will be appreciated that other examples may involve more operations, fewer operations, different operations, or a different sequence of operations than is shown in FIG. 21.

In block 2102, the system determines assignments of one or more categories to a set of unstructured text documents. Each text document may be assigned one or more categories. The category assignments may be input by a user (e.g., via the GUI 2000 of FIG. 20), determined by a rule-based model, or both. The assignments may include any manually corrected assignments by the user using the GUI described above.

In block 2104, the system generates training data based on the assignments. The training data may include relationships between the text documents and their assigned categories. For example, the training data may include a database in which each row corresponds to a text document. A first column of the database can include the content of each text document, and a second column of the database can include the categories assigned to each text document.

In block 2106, the system trains a machine-learning model based on the training data. For example, the system can perform a supervised training process to tune the weights internal to the machine-learning model based on the training data. The machine-learning model may be a neural network, a decision tree, a Naive Bayes classifier, or another kind of machine-learning model. Once trained, the machine-learning model may be able to accurately classify text documents into the categories of a predefined schema. For example, the machine-learning model may be able to receive a text document as input, determine which categories to assign to the text document based on the content of the text document, and generate an output indicating the selected categories.

In block 2108, the system tunes a rule-based model based on the assignments. For example, the system can adjust a property of the rule-based model based on the assignments. If the assignments were generated by the rule-based model, this process can serve as a kind of feedback loop to incrementally improve the accuracy of the rule-based model over time.

Figure 22:
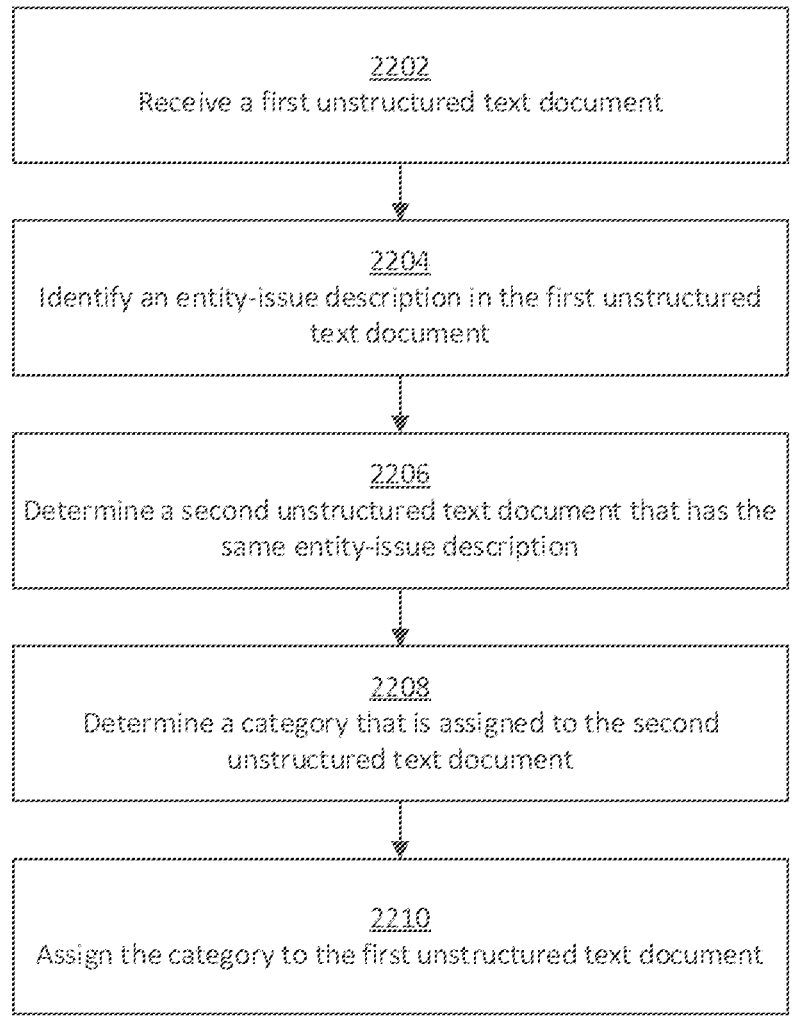
FIG. 22 shows a flowchart of an example of a process for automatically assigning one or more categories to an unstructured text document based on its similarity to another unstructured text document according to some aspects of the present disclosure.

In some examples, the system can implement a "shortcut" to quickly assign categories to text documents, for example without executing a rule-based model or a machine-learning model. The shortcut can be an automated assignment process that is faster and consumes fewer computing resources than a rule-based model or a machine-learning model, though it may not be as accurate. One example of the shortcut will now be described below with respect to FIG. 22.

In block 2202, the system can receive a first unstructured text document. The first unstructured text document can be received from any suitable source, such as a database.

In block 2204, the system can identify an entity-issue description in the first unstructured text document. For example, the system may implement some or all of operations 1804-1808 of FIG. 18 to identify an entity-issue description in the first unstructured text document.

In block 2206, the system determines a second unstructured text document that has the same entity-issue description. For example, the system may have previously processed a set of unstructured text document to determine their entity-issue descriptions. Within that set may be a second unstructured text document that has the same entity-issue description as the first unstructured text document.

In block 2208, the system determines one or more categories that are assigned to the second unstructured text document. For example, the system may have previously executed a rule-based model or a trained machine-learning model on the second unstructured text document to assign one or more categories to the second unstructured text document. And that system may have previously stored that assignment in a database. So, the system can refer to the database to determine which categories are assigned to the second unstructured text document.

In block 2210, the system can assign the same categories to the first unstructured text document. In other words, the system can determine which categories are assigned to the second unstructured text document and assign those same categories to the first unstructured text document. In this way, the system can take advantage of the fact that the two unstructured text documents will likely have the same categorizations if they have the same entity-issue descriptions, in order to rapidly categorize the first unstructured text document. The above process can be repeated for any number of additional unstructured text documents to rapidly categorize them.

Figure 23:
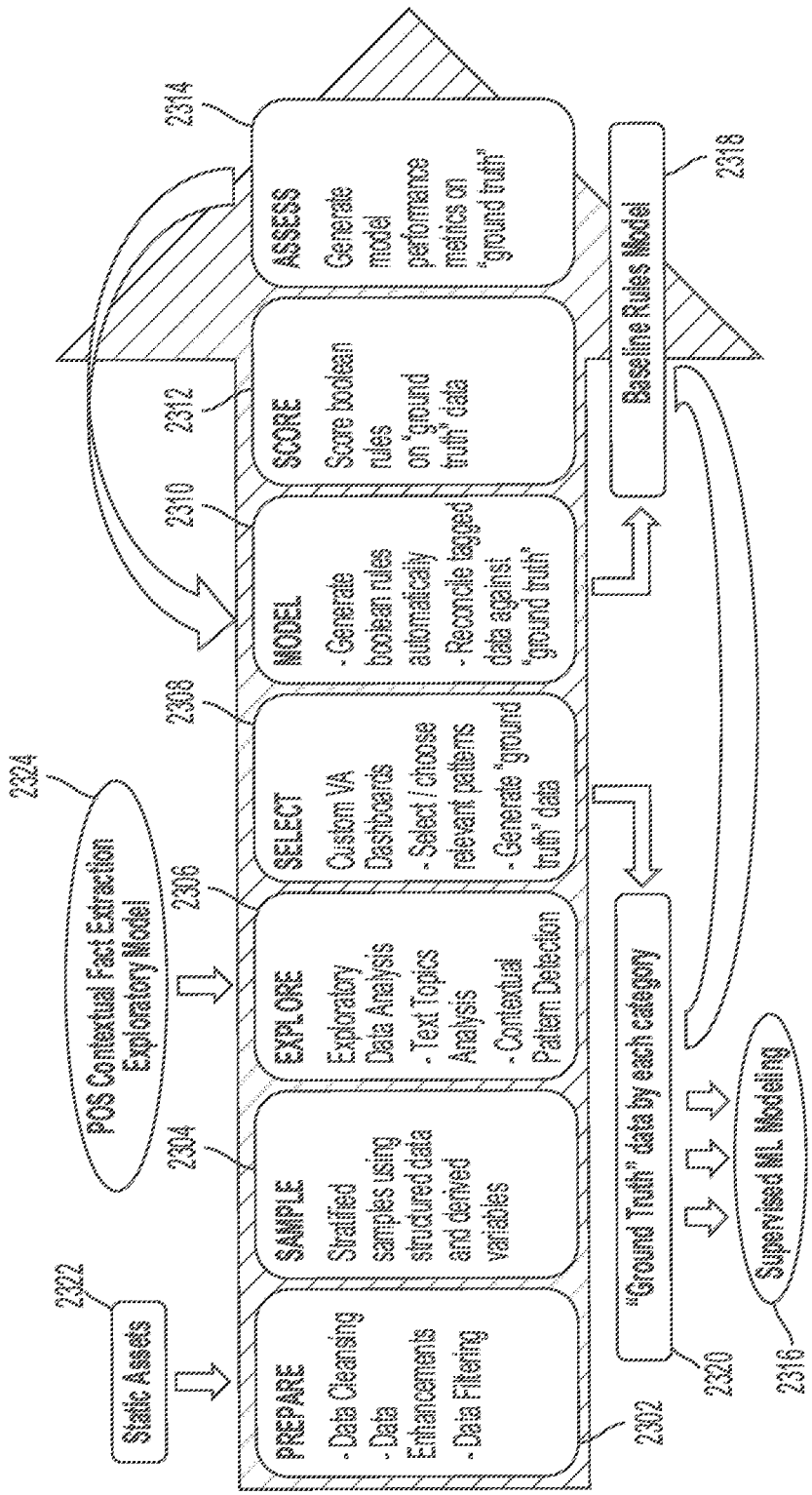
FIG. 23 shows an example of an overall pipeline for text analytics according to some aspects of the present disclosure.

FIG. 23 shows an example of an overall pipeline for text analytics according to some aspects of the present disclosure. The pipeline can be implemented by a computer system.

The pipeline can begin at block 2302, where the system receives static assets 2322 and a group of text documents. An example of static assets 2322 may be standard acronyms for a given domain of interest that may help with evaluating text documents in that domain. The system can use the static assets 2322 to perform data cleansing, data enhancements, and/or data filtering on the group of text documents. These operations may correspond to some or all of blocks 1402-1406 of FIG. 14 and/or blocks 1802-1806 of FIG. 18. In some examples, the group of text documents may be enhanced by adding data from a database to one or more of the text documents in the group. For instance, if a text document relates to a vehicle, the text document may be augmented with a make and model of the vehicle, where that information may be extracted from a database.

At block 2304, the system samples the group of textual documents to derive a set of text documents that will undergo further investigation. The set of text documents may be a proper subset of the group of text documents. The group of text documents may be sampled using any suitable sampling technique, such as stratified sampling. The set of text documents may alternatively be chosen from the group based on their size, the number of words or sentences in the text documents, etc.

At block 2306, the system analyzes the set of text documents using the entity POS dataset, the issue POS dataset, and the connector POS dataset to identify entity-issue descriptions therein. For example, each of the text documents may be evaluated using the process shown in FIG. 16. This technique for evaluating text documents may be referred to as a "POS Contextual Fact Extraction Exploratory Model" 2324.

At block 2308, the system presents custom dashboards to the user for selecting relevant patterns and "ground truth data" 2320 that can be used as training data for a machine-learning model, which is depicted in FIG. 23 in the box labeled "Supervised ML Modelling." An example of such a dashboard can be the GUI 2000 shown in FIG. 20. In some examples, the training data can be generated by the user interacting with the GUI 2000 to assign, or confirm the assignment of, topics to text documents.

At block 2310, the system can generate rules for a rule-based model, which is depicted in FIG. 23 as the "Baseline Rules model." The rules may be Boolean rules. The rules can be generated or updated based on the assignments of topics to text documents, for example by a human interacting with the dashboards described above. The system can automatically generate the rules by executing a script that translates inputs and selections provided by the user via the dashboard into one or more corresponding rules.

At block 2312, the system can score one or more of the new rules generated at block 2310. For example, the system can evaluate one or more of the new rules for accuracy. This may involve applying the new rules to ground truth data 2320 to determine their accuracy.

At block 2314, the system can compute performance metrics associated with the new rules. The performance metrics may indicate the accuracy of the new rules or other performance factors. Examples of the performance metrics may include precision, recall, and F1-scores.

In some examples, the performance metrics can be computed based on the ground truth data 2320 generated in block 2308 and the scores generated in block 2312. For example, the performance metrics can gauge the performance of the models by comparing the model results to the human-tagged documents.

In some examples, the performance metrics can be fed back to block 2310 to tune the models through adjustments to the Boolean rules. The objective can be to increase model performance by reducing false positives (e.g., the model tagged a document whereas the human determined it should not be tagged) and/or by reducing false negatives (e.g., the model did not tag a document whereas the human determined it should be tagged).

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
one or more processors; and
one or more memories including program code that is executable by the one or more processors for causing the one or more processors to perform operations including:
receiving unstructured text documents from one or more sources, wherein the unstructured text documents describe issues with entities;
determining entity-issue descriptions corresponding to the unstructured text documents, wherein each of the entity-issue descriptions is a text snippet extracted from a corresponding unstructured text document and wherein the text snippet includes a combination of at least two terms, and wherein the combination of at least two terms includes an entity term, an issue term, and a connector term that links the entity term to the issue term; and generating a graphical user interface indicating the entity-issue descriptions corresponding to the unstructured text documents, the graphical user interface indicating assignments of the unstructured text documents to one or more categories of a predefined schema by a user or a rule-based model, the one or more categories being different from the entity-issue descriptions, the graphical user interface being configured to allow the user to adjust the assignments of the unstructured text documents to the one or more categories based on the entity-issue descriptions in the unstructured text documents;

wherein the graphical user interface includes a table of rows, each row in the table corresponding to one of the unstructured text documents and indicating a respective entity-issue description in the unstructured text document, each row further indicating the one or more categories of the predefined schema assigned to the unstructured text document, and each row of the graphical user interface further including a graphical button that is selectable to allow the user to selectively view the unstructured text document corresponding to the row; and wherein the assignments of the unstructured text documents to the one or more categories are usable to tune the rule-based model or to generate training data for training a machine-learning model that is different than the rule-based model.

2. The system of claim 1, wherein the operations further include:

applying the rule-based model to the unstructured text documents, wherein the rule-based model is configured to assign the one or more categories to each of the unstructured text documents based on a predefined set of rules, the predefined set of rules indicating which of the one or more categories to assign to the unstructured text documents based on keywords in the unstructured text documents;

wherein the graphical user interface is configured to allow the user to approve or disapprove the one or more categories assigned to each of the unstructured text documents by the rule-based model.

3. The system of claim 1, wherein the operations further include:

determining a respective frequency at which each of the entity-issue descriptions occurs in the unstructured text documents; and configuring the graphical user interface to indicate the respective frequency at which each of the entity-issue descriptions occurs in the unstructured text documents.

4. The system of claim 1, wherein the operations further include:

generating a first graphical visualization in the graphical user interface indicating how many times each of the entities is mentioned in the unstructured text documents; and generating a second graphical visualization in the graphical user interface indicating how many times each of the issues is mentioned in the unstructured text documents.

5. The system of claim 1, wherein the graphical user interface further includes:

a first button for approving all of the assignments; and
a second button for disapproving all of the assignments.

6. The system of claim 1, wherein the graphical user interface further includes:

a button that is selectable to display a window indicating the one or more categories that are assignable to the unstructured text documents.

7. The system of claim 1, wherein the operations further include:

prior to generating the graphical user interface, executing the rule-based model to automatically assign a first set of categories to the unstructured text documents, the first set of categories being different from the entity-issue descriptions; and generating the graphical user interface such that each row of the graphical user interface further indicates:
the first set of categories assigned by the rule-based model to the unstructured text document corresponding to the row; and
a second set of categories assigned by the user to the unstructured text document corresponding to the row.

8. The system of claim 7, wherein each row of the graphical user interface further indicates one or more keywords that are present in the unstructured text document and that were used by the rule-based model to determine the first set of categories to assign to the unstructured text document, wherein the one or more keywords are different from the first set of categories and the second set of categories.

9. The system of claim 1, wherein the operations further involve storing change records indicating manual changes to the assignments by the user over a time period.

10. The system of claim 1, wherein the graphical user interface further includes a filtering option that is selectable to filter the unstructured text documents based on a selected category, such that only a subset of the unstructured text documents assigned to the selected category are displayed in the graphical user interface.

11. The system of claim 1, wherein the operations further involve executing an automated assignment process configured to assign additional unstructured text documents to the one or more categories, the automated assignment process being performed based on the assignments of the unstructured text documents to the one or more categories, the additional unstructured text documents being different from the unstructured text documents.

12. The system of claim 11, wherein the automated assignment process involves:

for each of the additional unstructured text documents:
identifying an entity-issue description in the additional unstructured text document;
determining at least one unstructured text document that has a same entity-issue description as the entity-issue description in the additional unstructured text document;
determining at least one category previously assigned to the at least one unstructured text document; and
applying the at least one category to the additional unstructured text document.

13. The system of claim 1, wherein operations further involve:

generating the training data based on the assignments of the unstructured text documents to the one or more categories; and
training the machine-learning model based on the training data.

14. The system of claim 1, wherein operations further involve:

tuning the rule-based model by adjusting one or more properties of the rule-based model, based on the assignments of the unstructured text documents to the one or more categories.

15. A method comprising:

receiving, by one or more processors, unstructured text documents from one or more sources, wherein the unstructured text documents describe issues with entities;

determining, by the one or more processors, entity-issue descriptions corresponding to the unstructured text documents, wherein each of the entity-issue descriptions is a text snippet extracted from a corresponding unstructured text document and wherein the text snippet includes a combination of at least two terms, and wherein the combination of at least two terms includes an entity term, an issue term, and a connector term that links the entity term to the issue term; and generating, by the one or more processors, a graphical user interface indicating the entity-issue descriptions corresponding to the unstructured text documents, the graphical user interface indicating assignments of the unstructured text documents to one or more categories of a predefined schema by a user or a rule-based model, the one or more categories being different from the entity-issue descriptions, the graphical user interface being configured to allow the user to adjust the assignments of the unstructured text documents to the one or more categories based on the entity-issue descriptions in the unstructured text documents;

wherein the graphical user interface includes a table of rows, each row in the table corresponding to one of the unstructured text documents and indicating a respective entity-issue description in the unstructured text document, each row further indicating the one or more categories of the predefined schema assigned to the unstructured text document, and each row of the graphical user interface further including a graphical button that is selectable to allow the user to selectively view the unstructured text document corresponding to the row; and wherein the assignments of the unstructured text documents to the one or more categories are usable to tune the rule-based model or to generate training data for training a machine-learning model that is different than the rule-based model.

16. The method of claim 15, further comprising:

applying the rule-based model to the unstructured text documents, wherein the rule-based model is configured to assign the one or more categories to each of the unstructured text documents based on a predefined set of rules, the predefined set of rules indicating which of the one or more categories to assign to the unstructured text documents based on keywords in the unstructured text documents;

wherein the graphical user interface is configured to allow the user to approve or disapprove the one or more categories assigned to each of the unstructured text documents by the rule-based model.

17. The method of claim 15, further comprising:

determining a respective frequency at which each of the entity-issue descriptions occurs in the unstructured text documents; and configuring the graphical user interface to indicate the respective frequency at which each of the entity-issue descriptions occurs in the unstructured text documents.

18. The method of claim 15, further comprising:

generating a first graphical visualization in the graphical user interface indicating how many times each of the entities is mentioned in the unstructured text documents; and generating a second graphical visualization in the graphical user interface indicating how many times each of the issues is mentioned in the unstructured text documents.

19. The method of claim 15, wherein the graphical user interface further includes:

a first button for approving all of the assignments; and a second button for disapproving all of the assignments.

20. The method of claim 15, wherein the graphical user interface further includes:

a button that is selectable to display a window indicating the one or more categories that are assignable to the unstructured text documents.

21. The method of claim 15, wherein each row of the graphical user interface further indicates:

a first set of categories assigned by the user to the unstructured text document corresponding to the row; and a second set of categories assigned by the rule-based model to the unstructured text document corresponding to the row.

22. The method of claim 21, wherein each row of the graphical user interface further indicates one or more keywords that are present in the unstructured text document and that were used by the rule-based model to determine the second set of categories to assign to the unstructured text document.

23. The method of claim 15, further comprising storing change records indicating manual changes to the assignments by the user over a time period.

24. The method of claim 15, further comprising executing an automated assignment process configured to assign additional unstructured text documents to the one or more categories, the automated assignment process being performed based on the assignments of the unstructured text documents to the one or more categories, the additional unstructured text documents being different from the unstructured text documents.

25. The method of claim 24, wherein the automated assignment process involves:

for each of the additional unstructured text documents:
identifying an entity-issue description in the additional unstructured text document;
determining at least one unstructured text document that has a same entity-issue description as the entity-issue description in the additional unstructured text document;
determining at least one category previously assigned to the at least one unstructured text document; and
applying the at least one category to the additional unstructured text document.

26. The method of claim 15, further comprising:

generating the training data based on the assignments of the unstructured text documents to the one or more categories; and training the machine-learning model based on the training data.

27. The method of claim 15, further comprising:

tuning the rule-based model by adjusting one or more properties of the rule-based model, based on the assignments of the unstructured text documents to the one or more categories.

28. A non-transitory computer-readable medium comprising program code that is executable by one or more processors for causing the one or more processors to perform operations including:

receiving unstructured text documents from one or more sources, wherein the unstructured text documents describe issues with entities;

determining entity-issue descriptions corresponding to the unstructured text documents, wherein each of the entity-issue descriptions is a text snippet extracted from a corresponding unstructured text document and wherein the text snippet includes a combination of at least two terms, and wherein the combination of at least two terms includes an entity term, an issue term, and a connector term that links the entity term to the issue term; and generating a graphical user interface indicating the entity-issue descriptions corresponding to the unstructured text documents, the graphical user interface indicating assignments of the unstructured text documents to one or more categories of a predefined schema by a user or a rule-based model, the one or more categories being different from the entity-issue descriptions, the graphical user interface being configured to allow the user to adjust the assignments of the unstructured text documents to the one or more categories based on the entity-issue descriptions in the unstructured text documents;

wherein the graphical user interface includes a table of rows, each row in the table corresponding to one of the unstructured text documents and indicating a respective entity-issue description in the unstructured text document, each row further indicating the one or more categories of the predefined schema assigned to the unstructured text document, and each row of the graphical user interface further including a graphical button that is selectable to allow the user to selectively view the unstructured text document corresponding to the row; and wherein the assignments of the unstructured text documents to the one or more categories are usable to tune the rule-based model or to generate training data for training a machine-learning model that is different than the rule-based model.

29. The non-transitory computer-readable medium of claim 28, wherein the entity-issue descriptions are determined at least in part by:

determining parts-of-speech associated with the unstructured text documents; and identifying the entity-issue descriptions based on the parts-of-speech.

* * * * *